(12) United States Patent
Bonner et al.

(10) Patent No.: US 8,469,261 B2
(45) Date of Patent: Jun. 25, 2013

(54) SYSTEM AND METHOD FOR PRODUCT IDENTIFICATION

(75) Inventors: Brett Bracewell Bonner, New Richmond, OH (US); Cameron Dee Dryden, West Roxbury, MA (US); Andris Jankevics, Westford, MA (US); Justin E. Kolterman, Brookfield, WI (US); Hsin-Yu Sidney Li, Lexington, MA (US); Torsten Volker Platz, Cambridge, MA (US); Michael David Roberts, Windham, NH (US); Pirooz Vatan, Lexington, MA (US)

(73) Assignee: Sunrise R&D Holdings, LLC, Cincinnati, OH (US)

( * ) Notice: Subject to any disclaimer, the term of this patent is extended or adjusted under 35 U.S.C. 154(b) by 155 days.

(21) Appl. No.: 13/047,532

(22) Filed: Mar. 14, 2011

(65) Prior Publication Data

US 2011/0248083 A1    Oct. 13, 2011

Related U.S. Application Data

(60) Provisional application No. 61/430,804, filed on Jan. 7, 2011, provisional application No. 61/313,256, filed on Mar. 12, 2010.

(51) Int. Cl.
*G06F 17/00* (2006.01)

(52) U.S. Cl.
USPC ......................................................... 235/375

(58) Field of Classification Search
USPC .................... 235/375, 383, 385, 462.14, 439, 235/475
See application file for complete search history.

(56) References Cited

U.S. PATENT DOCUMENTS

| | | | |
|---|---|---|---|
| 4,972,494 A | 11/1990 | White et al. | |
| 5,497,314 A | 3/1996 | Novak | |
| 6,484,066 B1 | 11/2002 | Riess et al. | |
| 7,000,839 B2 * | 2/2006 | Good et al. | 235/462.14 |
| 7,337,960 B2 | 3/2008 | Ostrowski et al. | |
| 2002/0138374 A1 | 9/2002 | Jennings et al. | |
| 2009/0134221 A1 | 5/2009 | Zhu et al. | |

OTHER PUBLICATIONS

International Search Report and Written Opinion of the International Searching Authority as issued for International Appln. No. PCT/US2011/028348, dated Dec. 23, 2011.

* cited by examiner

*Primary Examiner* — Seung Lee
(74) *Attorney, Agent, or Firm* — Pillsbury Winthrop Shaw Pittman LLP

(57) ABSTRACT

A system and method for identifying an object includes a plurality of object sensors, each object sensor configured and arranged to determine at least one parameter describing objects as they are relatively moved with respect to a sensing volume and having a known position and attitude with respect to the sensing volume. A location sensor is configured and arranged to produce position information relating to the relative movement. Outputs from the object and location sensors are passed to a processor and the parameters are associated with respective ones of the objects on the basis of the position information and on the basis of the known positions and attitudes of the sensors. For each object having associated parameters, the processor compares the parameters to known item parameters to assign item identification to the object.

12 Claims, 21 Drawing Sheets

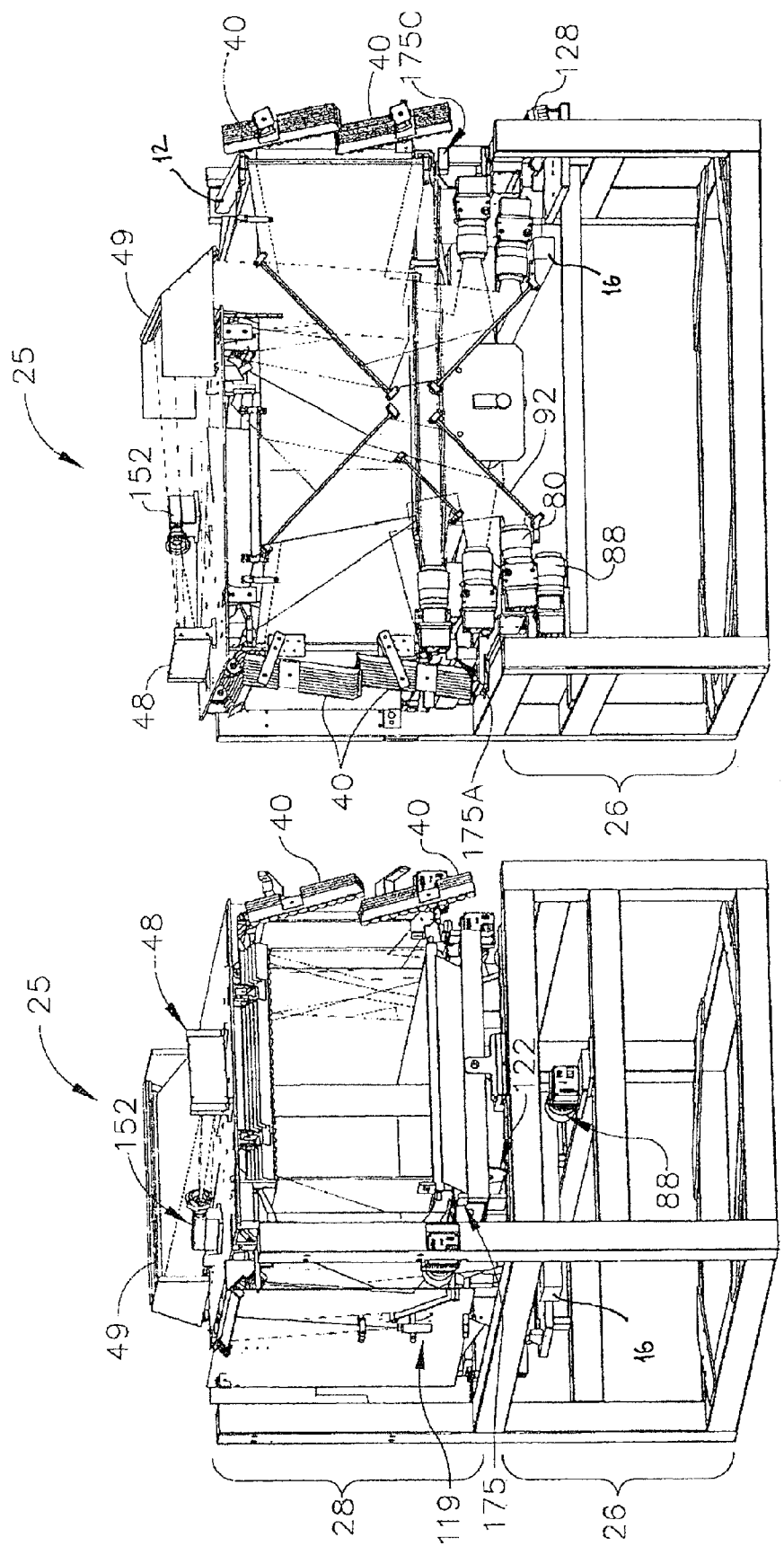

SYSTEM AND METHOD FOR PRODUCT IDENTIFICATION

This application claims priority to U.S. Provisional Application No. 61/430,804 filed Jan. 7, 2011 and U.S. Provisional Application No. 61/313,256, filed Mar. 12, 2010, each of which is incorporated by reference in its entirety herein.

TECHNICAL FIELD

The description herein relates generally to methods and systems for identifying items and more particularly for identifying items passing through a sensing volume.

BACKGROUND

In a variety of environments, it may be useful to identify objects and to read coded information related to those objects. For example, point-of-sale (POS) systems make use of bar code readers to identify products to be purchased. Likewise, shipping, logistics and mail sorting operations may make use of automated identification systems. Depending on the context, coded information may include, prices, destinations, or other information relating to the object on which the code is placed. In general, it is useful to reduce a number of errors or exceptions that require human intervention in the operation.

SUMMARY

Described herein are implementations of various approaches to item identification and code reading.

An aspect of an embodiment includes a method including determining at least one parameter describing objects as they are relatively moved with respect to a sensing volume using a sensor having a known position and attitude with respect to the sensing volume, generating location information relating to the relative moving, and passing the parameters and the position information to a processor, and associating the parameters with respective ones of the objects on the basis of the position information and on the basis of the known positions and attitudes of the sensors, and for each object having associated parameters, comparing the parameters to known item parameters to assign item identification to the object.

An aspect of an embodiment includes a system including a plurality of sensors, each sensor configured and arranged to determine at least one parameter describing objects as they are relatively moved with respect to a sensing volume and having a known position and attitude with respect to the sensing volume, a location sensor, configured and arranged to produce position information relating to the relative movement, and a processor, configured to receive the parameters and to associate them with respective ones of the objects on the basis of the position information and on the basis of the known positions and attitudes of the sensors and to compare the parameters to known item parameters to assign item identification to the object.

An aspect of an embodiment of the invention includes a system for asynchronously identifying an item within a sensing volume includes a plurality of object sensors, each object sensor configured and arranged to determine at least one parameter describing objects as they are relatively moved with respect to the sensing volume, and having a known position and attitude with respect to the sensing volume. The system includes a position sensor, configured and arranged to produce position information relating to the relative movement, wherein the position information does not comprise system clock information and a processor, configured and arranged to receive the parameters from the object sensors and to associate the parameters with respective ones of the objects on the basis of the position information and on the basis of the known position and attitude of the object sensor that determined each respective parameter, without taking into account system clock information, and to, for each object having at least one associated parameter, compare the at least one associated parameter to known item parameters to assign an item identification to the object.

An aspect of an embodiment of the invention includes a method of asynchronously identifying an item within a sensing volume that includes determining at least one parameter describing objects as they are relatively moved with respect to the sensing volume, using a plurality of object sensors, each having a known position and attitude with respect to the sensing volume. The method includes producing position information relating to the relative movement, wherein the position information does not comprise system clock information, and associating the parameters with respective ones of the objects on the basis of the position information and on the basis of the known position and attitude of the object sensor that determined each respective parameter, without taking into account system clock information, and to, for each object having at least one associated parameter, compare the at least one associated parameter to known item parameters to assign an item identification to the object.

An aspect of an embodiment includes a tangible machine readable medium encoded with machine executable instructions for performing a method as described herein or for controlling an apparatus or system as described herein.

The above summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

These and other features will become better understood with regard to the following description, pending claims and accompanying drawings where:

FIG. 2A is an oblique view of an embodiment of a system for item identification;

FIG. 2B is an oblique view of the system of FIG. 2A;

DETAILED DESCRIPTION

Figure 1:
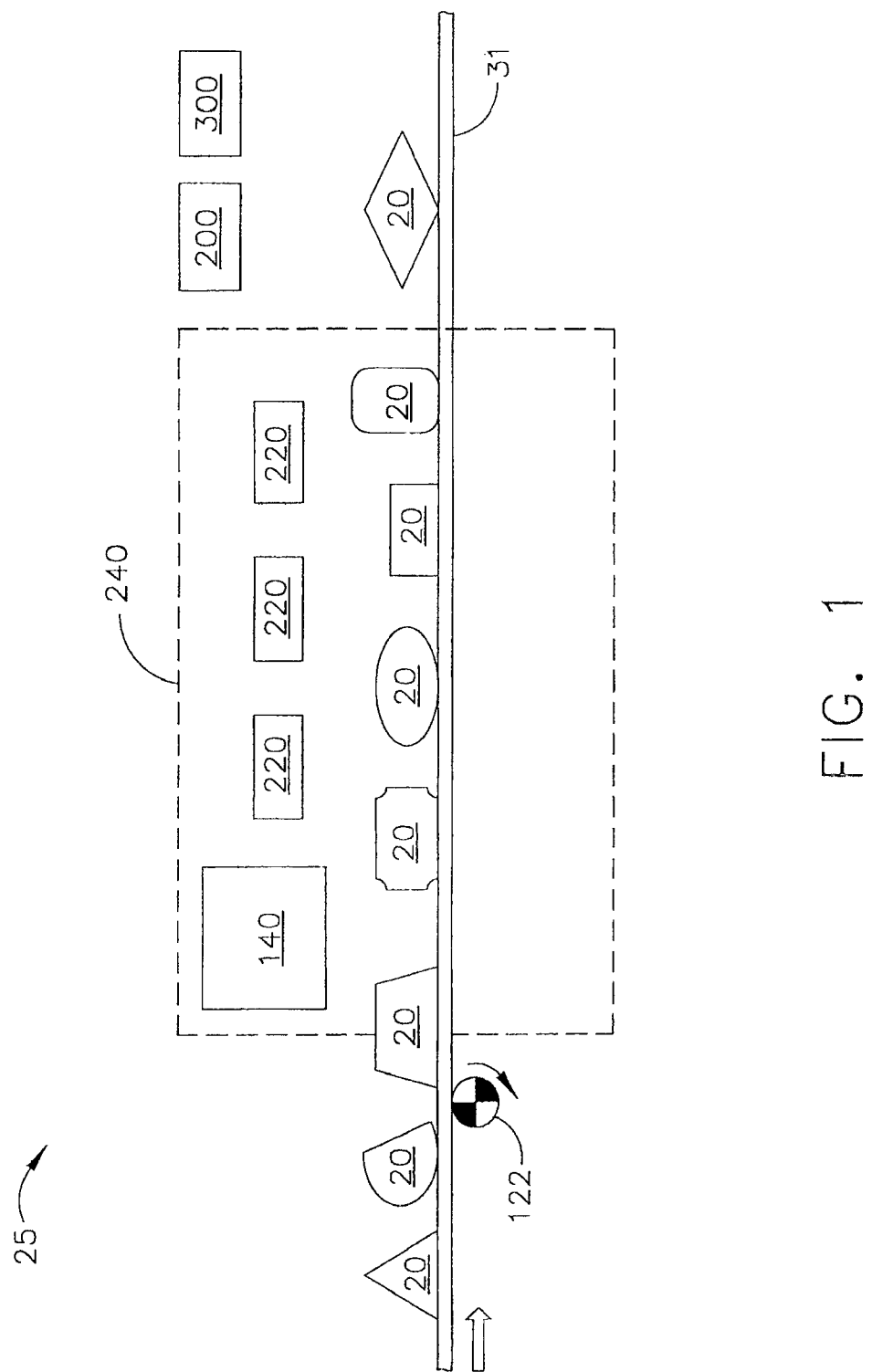
FIG. 1 schematically illustrates an embodiment of a system for item identification.
Figure 3A:
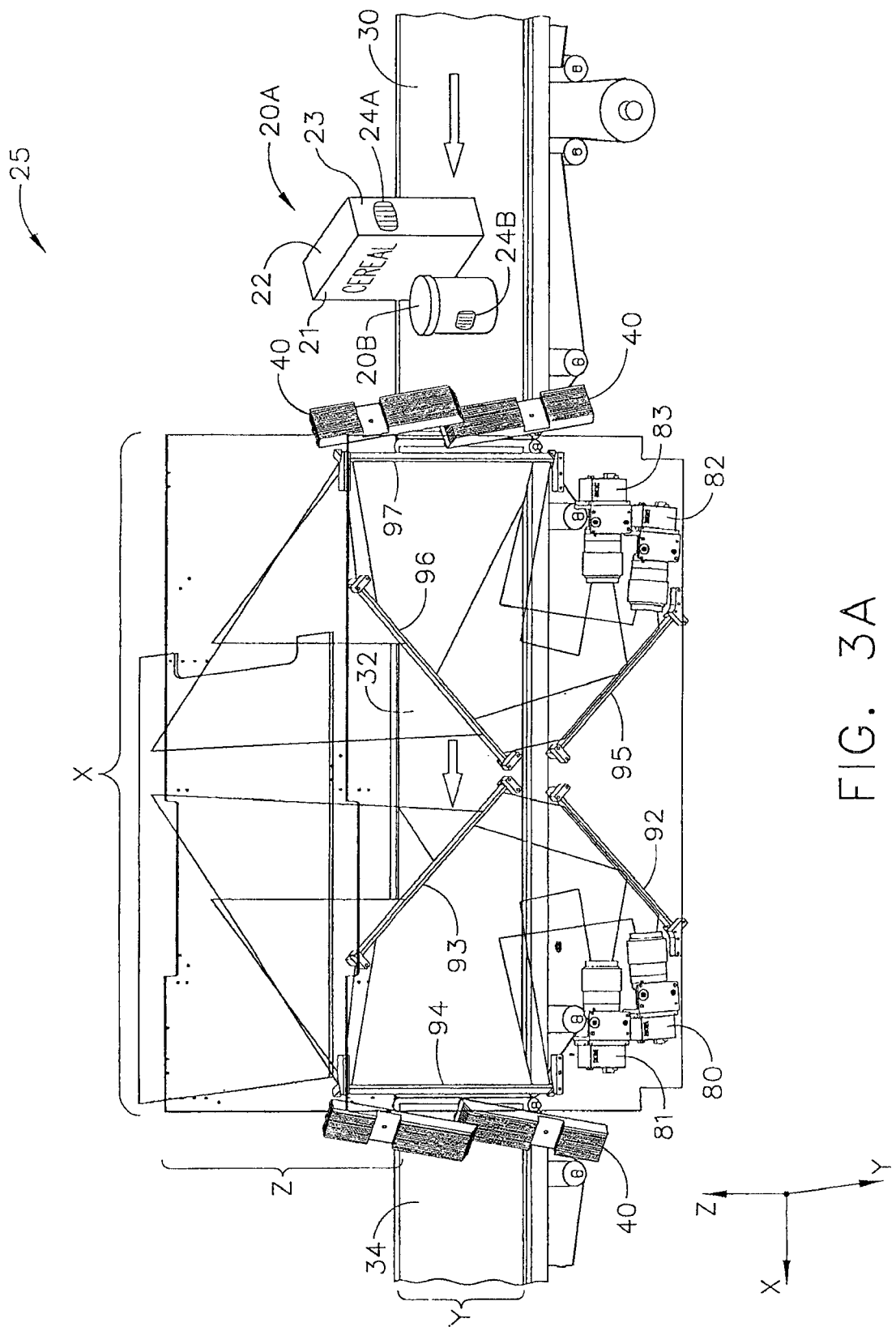
FIG. 3A is an oblique right side view of an embodiment of a system for item identification.

FIG. 1 schematically illustrates an object identification system 25. One or more items 20 to be identified are placed on a transport system to be carried through a sensing volume 240. In the notional embodiment shown here, the transport system is a conveyor belt 31. As a practical matter, the transport system may be made up of more than one conveyor belt to allow for additional control over item flow through the sensing volume. In an embodiment, as illustrated in FIG. 3A, three belts are used: an in-feed conveyor belt, onto which the items to be identified are loaded; a sensing volume conveyor belt, which moves the items through the sensing volume 240; and an out-feed conveyor belt, which takes items away from the sensing volume 240 for further processing. In, for example, a retail environment, "further processing" may include bagging, reverse logistics processing, and other processing that known to those having skill in the art. In some embodiments, the transport system includes only the sensing volume conveyor belt. Other belts, such as the in-feed conveyor belt or the out-feed conveyor belt can be added depending on the specific application contemplated.

As illustrated in the schematic diagram of FIG. 1, the transport system may be treated as if it were an infinite transport path. As will be described in detail below, in an embodiment, the item identification system may be designed in such a way that the processing algorithms treat each segment of belt as if it were a unique location and any item associated with that segment is consistently treated as if it were at that location. In this regard, the item identification system 25 may have no information regarding how or when items are placed on the belt and no information regarding what happens to them after they leave the sensing volume 240. In an embodiment, system 25 may assign linearly increasing location values to each segment of the essentially endless conveyor belt 31 as it enters sensing volume 240, analogous to a street address, and the system may act as though the street has an unbounded length. An item associated with a particular street address may be assumed to remain there.

Alternately, instead of moving objects through a fixed sensing volume, the volume could be scanned along fixed locations. That is, rather than a conveyor belt 31 moving objects, the sensing volume could be driving down the street looking at the items distributed at the ever increasing street address. For example, this could be applied in a warehouse environment in which a sensing device is driven along aisles and senses items arrayed on shelves.

The conveyor belt 31 is equipped with a transport location physical sensor 122. Transport location physical sensor 122 measures the position of the conveyor belt 31 relative to a fixed reference location in the sensing volume of the system 25. In some embodiments the transport location physical sensor 122 is an encoder associated with a roller of the sensing volume conveyor belt. The transport location physical sensor 122 produces a pulse every time the essentially endless conveyor belt 31 moves by a fixed incremental distance relative to the sensing volume 240.

By way of example, a rotary encoder may include delineations corresponding to 1 mil incremental movements of the conveyor belt 31. In principle, each delineation produces a single count in an ever-increasing accumulation, but in an embodiment, a number of counts may be aggregated for each system count. As an example, each system count may correspond to five nominal detector counts. Additionally, it may be useful to be able to account for slippage or other events that can cause a reverse movement of the belt. In this regard, one such approach would employ a quadrature encoder in which a pair of encoder outputs are out of phase with each other by 90°. In this approach, a direction may be assigned to the belt motion on the basis of a determination as to which of the two outputs occurred first.

The sensing volume 240 is the volume of space through which the transport system carries the items 20, and is delineated by the combined sensing regions/fields-of-view of a number of item parameter sensors 220, including, but not limited to, the item isolator 140.

Sensing volume 240 includes a number of parameter sensors 220 for sensing items 20 traveling through it. Some embodiments have at least two different parameter sensors 220: an item isolator and an indicia reading system which includes one or more indicia sensors. In embodiments, additional parameter sensors, such as a dimension sensor and/or a weight sensor may be included. Parameter sensors may be understood as being the physical sensors, which convert some observable parameter into electrical signals, or the physical sensor in combination with an associated parameter processing function, which transforms raw data (initial sensing data) into digital values used in further processing. The parameter processors can be co-located and/or embedded with the physical sensors or can be software modules running in parallel with other modules on one or more general purpose computers.

In an embodiment, the output values measured by parameter sensors 220 are transferred to other software modules in the processors. This transfer may be, in an embodiment, asynchronous. Data from the parameter sensors 220 are associated with location information provided by the transport system location sensor and sent to two processing modules: the item description compiler 200, which performs the process of matching all parameter values collected for a particular item to create an item description, and the item identification processor 300, which queries a product description database to try to find a match between the item description and a product, and outputs either a product identification or an exception flag. Optionally, the system 25 may include an exception handler (shown in FIG. 15).

An embodiment of an item identification system 25 is illustrated in FIG. 2A. As shown, a sensing volume is within an upper housing 28. A lower housing 26 acts as a structural base for support of the sensing volume conveyor belt (as shown in FIG. 3A), the transport location physical sensor 122, and many of the optical and mechanical components of the system 25, including without limitation an upward looking line-scan camera 88. As will be appreciated, a line-scan camera has a substantially planar field of view, though it is not strictly planar in the mathematical sense, but rather is essentially a thin rectangle having a low divergence.

In embodiments, the sensing volume 240 may be partially enclosed such that the enclosing walls form a tunnel structure. As illustrated in FIG. 2A, a tunnel structure is formed by the upper housing 28, providing convenient locations onto which elements of the various sensors may be attached, as well as reducing the possibility of undesirable intrusions into the sensing volume 240 by miscellaneous hands and objects. In the embodiment shown in FIG. 2A, the upper housing 28 is used as a structural base for support of the laser stripe generator 119, the area camera 152, the first area camera mirror 48, the second area camera mirror 49, illumination sources 40, the load cells 175, a light curtain generator 12, and various other optical and mechanical components.

The area camera 152 is aimed to observe the path of a line of laser light, a laser stripe, projected downward towards the transport system and any items thereon in its field of view. There is a known angle between the laser stripe generator 119 and the area camera 152 which causes the image of the laser stripe in the field of view of the area camera 152 to be displaced perpendicular to the laser stripe in proportion to the height of the item on which the laser stripe is projected.

As illustrated in FIG. 2B, a first load cell 175A, a second load cell (not seen from this perspective), a third load cell 175C and a fourth load cell (not seen from this perspective) are positioned to measure a load on the belt. Six line-scan cameras, including but not limited to a lower right out-feed end line-scan camera 80 and an upward looking line-scan camera 88, are shown mounted on the lower housing 26 in FIG. 2B. In an embodiment, the system 25 includes eleven line-scan cameras arranged at various positions and various attitudes to fully cover the sensing volume within the upper housing. In an embodiment, each camera has a position and attitude that are sufficiently well-known that a location of a detected item can be determined to within less than about ¼ in. (i.e., less than about 1 degree of arc). In this regard, the cameras may be precision mounted within a structural module such that mounting the structural module to a frame member of the system provides precise information regarding the direction in which the camera is pointed. In an embodiment, some or all of the cameras may include a polarizing filter to reduce specular reflection from packaging materials that can tend to obscure bar codes. In this configuration, it may be useful to increase light output from the light sources in order to compensate for light loss due to the polarizing filters.

The line-scan cameras are structured and arranged such that they have a field of view that includes line-scan camera mirrors. A first lower right out-feed end line-scan mirror 92 is shown in FIG. 2B, as an example of a line-scan mirror. The first lower right out-feed end line-scan mirror 92 reflects light from other line-scan mirrors (shown in FIG. 3A) into the lower right out-feed end line-scan camera 80, so that the lower right out-feed end line-scan camera 80 produces line-scan data about the item when it arrives within its field of view on the sensing volume conveyor belt 32 (not visible in FIG. 2B, see FIG. 3A). Also shown in FIG. 2B is a right-side downward looking illumination source 128.

In an embodiment, the conveyor belt may be about 20 inches wide and travel at a speed of about eighty feet per minute, or about sixteen inches per second. As will be appreciated, the speed of travel may be selected in accordance with the further processing operations to be performed on items after identification. For example, a grocery application may require a relatively slow belt speed to allow for a clerk to perform bagging tasks while a package sorting application may allow for a higher belt speed as sorted packages may be mechanically handled.

As illustrated in FIG. 2B, the upper housing may be used as a structural base for support of the area camera 152, the first area camera mirror 48, the second area camera mirror 49, illumination sources 40, and various of the optical and mechanical components of the system 25.

FIG. 3A illustrates right side camera optics usable to create images of a first item 20A and a second item 20B. The first item 20A is shown having a front side 21, a top side 22 and a left side 23. While not shown in FIG. 3A, the first item 20A also has a bottom side, a back side and a right side. While illustrated as a grocery product box in the Figures, the first item 20A could take the form of any item suitable for passage through the sensing volume in accordance with a selected application.

In the illustrated embodiment, first item 20A and the second item 20B are transported into the sensing volume by an in-feed conveyor belt 30 in the direction of motion toward the exit end of the in-feed conveyor belt 30 and toward the in-feed end of the sensing volume conveyor belt 32. The first item 20A and the second item 20B are transported through the sensing volume by sensing volume conveyor belt 32 in the direction of motion toward the exit end of the sensing volume conveyor belt 32 and toward the in-feed end of the out-feed conveyor belt 34.

Figure 4A:
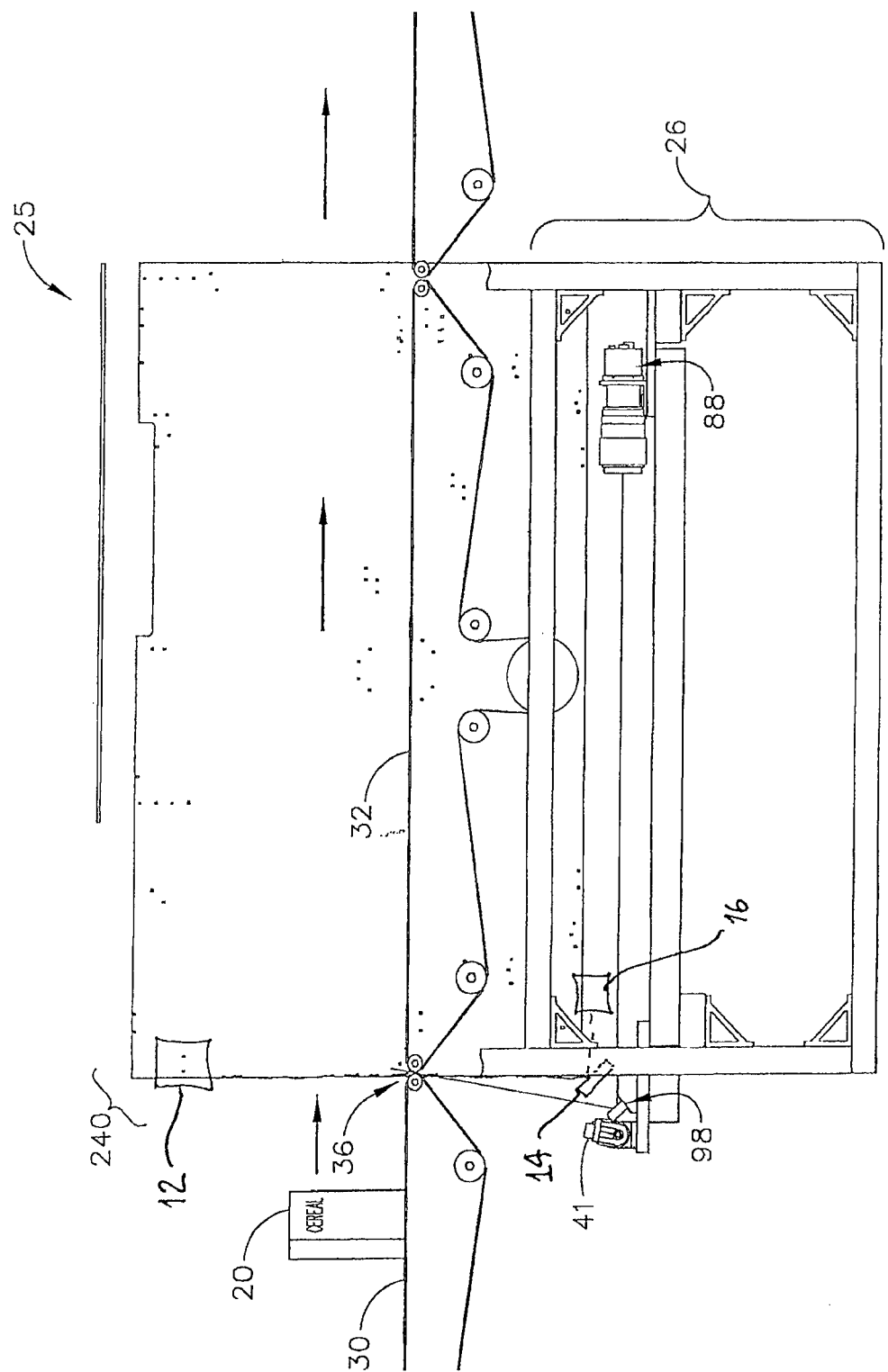
FIG. 4A is a left elevation view of an embodiment of a system for item identification.
Figure 4B:
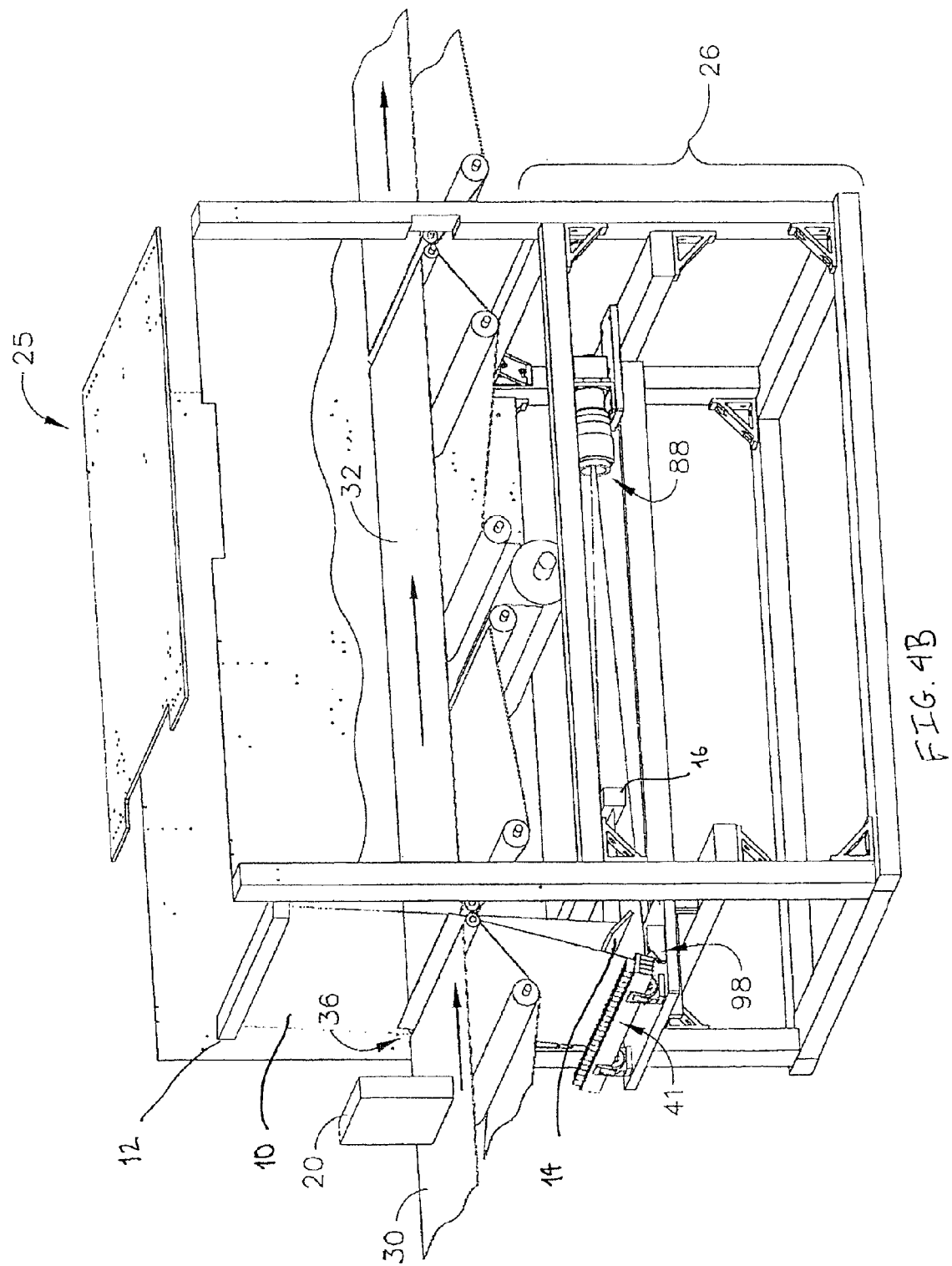
FIG. 4B is an oblique left side view of an embodiment of a system for item identification.

Upon entering the sensing volume, objects to be identified pass through a light curtain 10 generated by light curtain generator 12 as best seen in FIG. 4B. In the illustrated embodiment, the light curtain 10 is projected down towards a gap 36 between the sensing volume conveyor belt 32 and the in-feed conveyor belt 30 and is reflected by a mirror 14 to a detector 16. The light curtain generator may be, for example, a bar including a linear array of LEDs, arranged to provide a substantially planar sheet of light. The light curtain detector 16 may include a linear array of photodetectors that detect the light curtain projected by the LEDs. In order to improve the spatial resolution and reduce false negative readings at the photodetectors, the LEDs and detectors are sequentially activated in pairs. This approach tends to reduce the effects of potential stray light from one LED entering the detectors despite the presence of an object in the viewing field.

When an object passes through the curtain, it casts a shadow on the photodetectors, providing information on a width of the object passing through the light curtain. A series of measurements of this type can be used as one set of parameters for identifying the object. In an embodiment, the spatial resolution of the light curtain generator/detector set will be on the order of a few mm, though in principle, finer or coarser measurements may be useful, depending on the application. For the grocery application, a finer resolution may be required in order to distinguish similar product packages.

As seen in FIG. 3A, illumination sources 40 illuminate the sensing volume conveyor belt 32. A lower right out-feed end line-scan camera 80 has a field of view focused on a first lower right out-feed end line-scan mirror 92. The first lower right out-feed end line-scan mirror 92 reflects light from a second lower right out-feed end line-scan mirror 93, which reflects light from a third lower right out-feed end line-scan mirror 94. The third lower right out-feed end line-scan mirror 94 reflects light from the sensing volume conveyor belt 32. Thus, the lower right out-feed end line-scan camera 80 focuses its field of view on the sensing volume conveyor belt 32, capturing line-scan data about the first item 20A and the second item 20B as it is transported in the direction of motion along the sensing volume conveyor belt 32. Also shown is upper right in-feed end line-scan camera 83, which likewise images the sensing volume conveyor belt 32.

The lower right out-feed end line-scan camera 80 is operatively connected to an image processor, collecting the line-scan data. The image processor determines a parameter value of the first item 20A and a parameter value of the second item 20B being transported through the sensing volume.

In an embodiment, the image processor is the indicia reader. After the indicia reader collects the line-scan data corresponding to the first item 20A, it attempts to identify the first item's indicium 24A on the front side 21 of the first item 20A. In the illustrated case, there is no identification code on the front side of the item, so in operation the indicia reader will fail to identify the first item's indicium 24A based on the front side image. However, the indicia reader, receiving line-scan data from either the lower right out-feed end line-scan camera 80 or the upper right out-feed end line-scan camera 81, may successfully capture and identify the second item's indicium 24B.

A lower right in-feed end line-scan camera 82 has a field of view focused on a first lower right in-feed end line-scan minor 95. The first lower right in-feed end line-scan mirror 95 reflects light from a second lower right in-feed end line-scan mirror 96, which reflects light from a third lower right in-feed end line-scan mirror 97. The third lower right in-feed end line-scan mirror 97 reflects light off of the sensing volume conveyor belt 32. Thus, the lower right in-feed end line-scan camera 82 focuses its field of view on the sensing volume conveyor belt 32, capturing line-scan data about the first item 20A and the second item 20B being transported in the direction of motion along the sensing volume conveyor belt 32. After the indicia reader collects the line-scan data corresponding to the first item 20A, it identifies an indicium 24A on the left side 23 of the first item 20A.

In an embodiment, the line-scan cameras may be triggered by signals derived from a transport location physical sensor to capture a line-scan datum once for every five thousandths of an inch of travel of the conveyor belt 32. That is, when using an encoder having a 1 mil interval, each five intervals will constitute one system count, and one line scanned image will be captured.

Figure 3B:
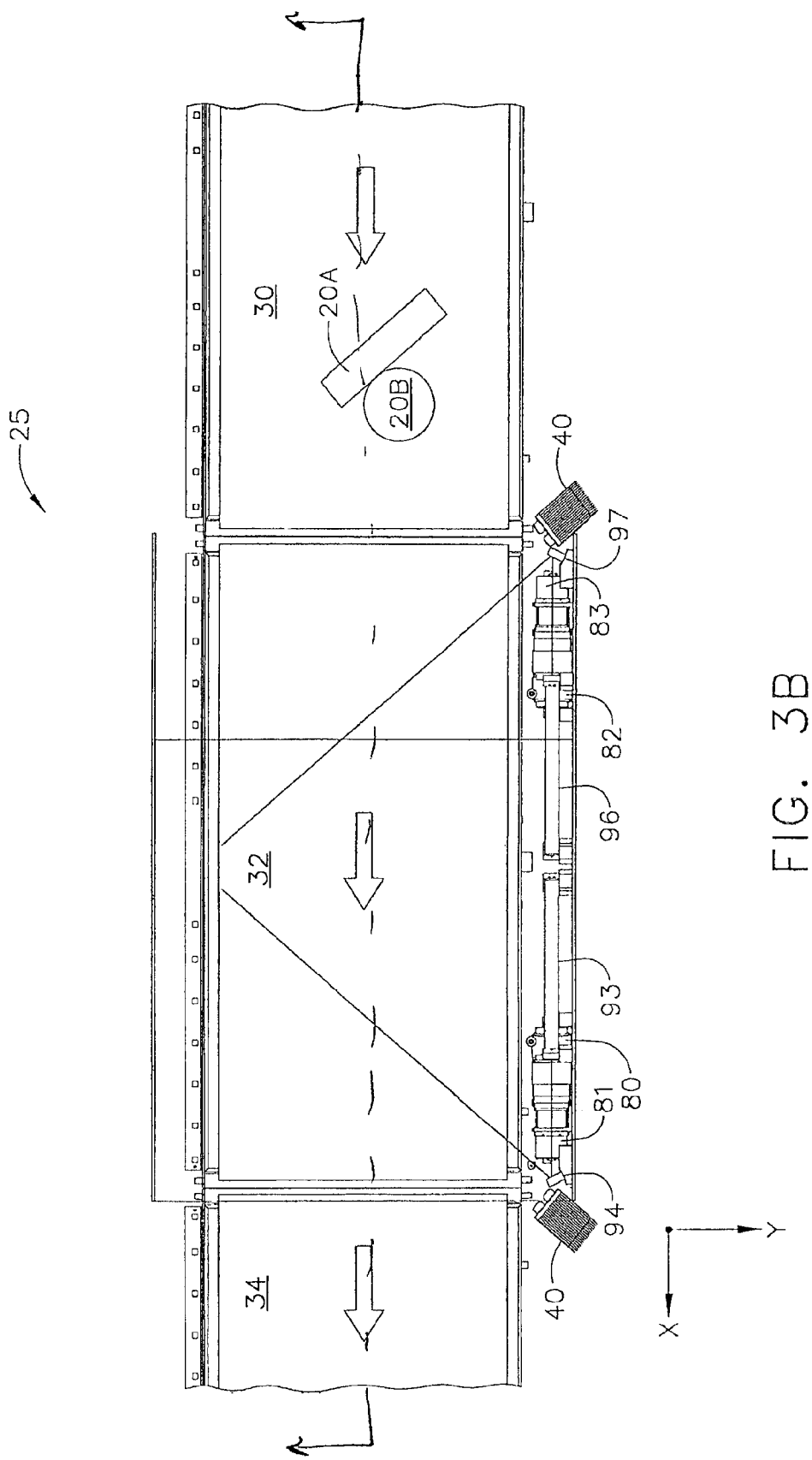
FIG. 3B is a top plan view of an embodiment of a system for item identification.

Turning to FIG. 3B, right side camera optics are illustrated and include, but are not limited to, the lower right in-feed end line-scan camera 82 and the lower right out-feed end line-scan camera 80. The right side camera optics capture light from the illumination source 40 reflected back into the field of view of the right side camera optics on one or more line-scan mirrors. The line-scan mirrors shown in FIG. 3B include the second lower right out-feed end line-scan mirror 93, the third lower right out-feed end line-scan mirror 94, the second lower right in-feed end line-scan mirror 96, and the third lower right in-feed end line-scan mirror 97, though more or fewer minors can be included depending on the specific application contemplated.

FIG. 3B also shows the upper right out-feed end line-scan camera 81 and the upper right in-feed end line-scan camera 83 imaging the sensing volume conveyor belt 32, and when the in-feed conveyor belt 30 delivers the first and second items 20A and 20B to the sensing volume conveyor belt 32, these line-scan cameras will image the items as well. Eventually, the first and second items 20A and 20B will be out of sight of the upper right out-feed end line-scan camera 81 and the upper right in-feed end line-scan camera 83 when they are passed along to the out-feed conveyor belt 34.

In an embodiment, the line-scan cameras may be mounted horizontally to reduce dust build-up on the camera lenses. Folding mirrors may be used to provide selected field of view geometries to allow these horizontally mounted cameras to observe the sensing volume from different angles.

To achieve a desired depth of focus for each line-scan camera along with a fine image resolution to read indicia, the optical path for each line-scan camera should be several feet from each item 20 in the sensing volume. To allow for long optical paths without unduly expanding the size of the system 25, each line-scan camera's optical path may be folded, for example by line-scan mirrors 93, 94, 96, and 97.

Because the width of the field of view for each line-scan camera expands linearly as the optical distance from the line-scan camera increases, line-scan mirrors that are optically closer to the first item 20A and second item 20B may be wider than the belt width in the line scan direction. As will be appreciated, for an imaging field at a 45 degree angle to the belt, the field width is $\sqrt{2}$ times the belt width, and the mirror must be sufficiently wide to subtend that field. However, because each line-scan camera only images a narrow line sensing volume, about five thousandths of an inch in certain embodiments, each line-scan mirror can be very short in the perpendicular direction. In some embodiments, each line-scan minor is just a fraction of an inch tall. The line-scan mirrors are made of glass about one quarter of an inch thick and about one inch tall. In a device having a 20 inch wide sensing volume, the line scan mirrors may have widths from about eight inches to about thirty inches wide, depending on for what portion of the sensing volume that scan is responsible. The line-scan mirrors allow the optical paths for the bottom, top, and side perspectives of the fields of view of the line-scan cameras to be folded, while maintaining relatively narrow top and side walls, about seven inches thick in an embodiment.

Each line-scan camera produces line-scan data from light reflected off of the items 20 traveling through the sensing volume. In an embodiment, with the nominal speed of all of the conveyor belts and imaging resolution, the line-scan cameras operate at about three thousand two hundred lines per second, corresponding to exposure times of about three hundred microseconds. With typical line-scan camera technology, these short exposure times necessitate fairly bright illumination to yield high-contrast images. For reasonable energy and illumination efficiencies, an illumination source 40 may be selected to provide intense illumination with low divergence, focused along each line-scan camera's optical perspective.

Figure 3C:
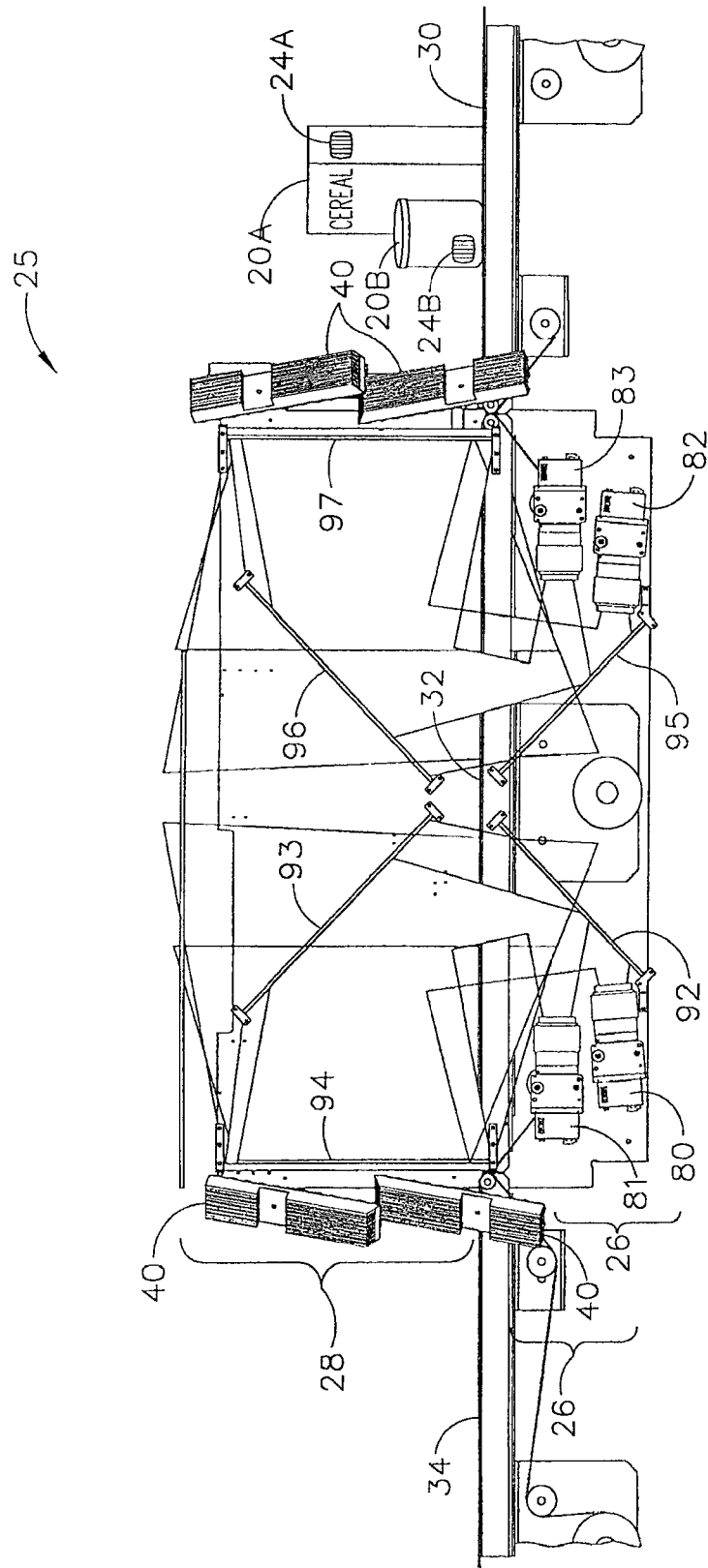
FIG. 3C is a right elevation view of an embodiment of a system for item identification.

FIG. 3C illustrates the right side camera optics. The right side camera optics include, but are not limited to, the lower right out-feed end line-scan camera 80, the upper right out-feed end line-scan camera 81, the lower right in-feed end line-scan camera 82, and the upper right in-feed end line-scan camera 83, which are each connected to the lower housing 26 of the system 25. The right side camera optics are shown focused using line-scan mirrors. In this embodiment, the first lower right out-feed end line-scan mirror 92 reflects light from the second lower right out-feed end line-scan mirror 93, which reflects light from the third lower right out-feed end line-scan mirror 94, which reflects light from the sensing volume conveyor belt 32. Furthermore, the first lower right in-feed end line-scan minor 95 reflects light from the second lower right in-feed end line-scan mirror 96, which reflects light from the third lower right in-feed end line-scan minor 97, which reflects light from the sensing volume conveyor belt 32. Light falls on the sensing volume conveyor belt 32 from the illumination source 40 mounted on the upper housing 28.

When the first item 20A and the second item 20B exit the out-feed end of the in-feed conveyor belt 30, they enter the in-feed end of the sensing volume conveyor belt 32 and pass through the fields of view of the right side camera optics, line-scan data is generated which corresponds to the first item 20A and the second item 20B. The first item 20A, bearing the indicium 24A, and the second item 20B, bearing the indicium 24B, exits the sensing volume when they are transported from the sensing volume conveyor belt 32 and onto the in-feed end of the out-feed conveyor belt 34. The multiple line-scan cameras, each with its own perspective, capture multiple images of the first item 20A and the second item 20B before they exit the sensing volume. The line-scan data generated is used by the system 25 to recognize parameters for each item as discussed further below.

An upward looking line-scan camera 88 is mounted on the lower housing 26, as illustrated in FIG. 4A. In this figure, the item 20 travels from left to right along the in-feed conveyor belt 30 through the sensing volume 240. A belt gap 36 is provided between the in-feed conveyor belt 30 and the sensing volume conveyor belt 32. Upward looking line-scan camera illumination source 41 provides an intense illumination of the belt gap 36 with low divergence, allowing upward looking line-scan camera 88 to yield a high-contrast image.

The upward looking line-scan camera 88 produces images from light, traveling through the belt gap 36, and onto the upward looking line-scan mirror 98. The light is generated by the upward looking line-scan camera illumination source 41 and is reflected off of item 20 as it travels from in-feed conveyor belt 30 over belt gap 36 and onto the sensing volume conveyor belt 32.

In addition to providing an image of item 20 for later analysis by the indicia reader, the upward looking line-scan camera 88 provides unobstructed images of the bottom of item 20. While analysis by the indicia reader can identify an indicium on the bottom of item 20, the dimensioning sensor uses the unobstructed images of the bottom of item 20 to help refine the measurements of item 20. Thus, in embodiments including upward looking line-scan camera 88, items of disparate heights (such as first item 20A and second item 20B shown in FIGS. 3A and 3C) can be placed adjacent to one another on the in-feed conveyor belt 30 without the item isolator treating the items of disparate heights as a single item having a more complex geometry.

As shown in FIG. 4B, the upward looking line-scan camera optical components, including upward looking line-scan camera illumination source 41, upward looking line-scan mirror 98, and upward looking line-scan camera 88, are located within the lower housing 26 of the system 25. In the illustrated embodiment, the optical path of upward looking line-scan camera 88 is folded only once, off of upward looking line-scan mirror 98. In other words, light reflected off of item 20 as the light crosses through the belt gap 36 is reflected off of upward looking line-scan mirror 98 to upward looking line-scan camera 88. As described previously, the item 20 is positioned over the belt gap 36 when the item 20 is transferred from the in-feed conveyor belt 30 to the sensing volume conveyor belt 32.

As will be appreciated, the upward looking camera is a dark field detector. That is, in the absence of an object in its measurement area, it will receive little or no reflected light, and the image will be dark. When an object is present in the measurement area, reflected light from the illumination source 41 will be reflected back to the camera. In contrast, the light curtain described above is a bright field detector. When no object is present, the image is bright, while when an object is present, the image field is shaded by the object, causing it to appear as a dark object in the detector.

Working in conjunction with each other, the two systems allow for detection and measurement of objects that may be difficult to detect with one or the other approach. For example, an object that is relatively dark, and/or a poor reflector may be difficult for the upward looking camera to distinguish from the dark background field. Similarly, an object that is relatively transparent may not produce sufficient contrast to be detected by the light curtain. The inventors have determined that a good rate of object singulation can be obtained when using the two sensors in combination with the laser stripe generator 119 described below.

Figure 5A:
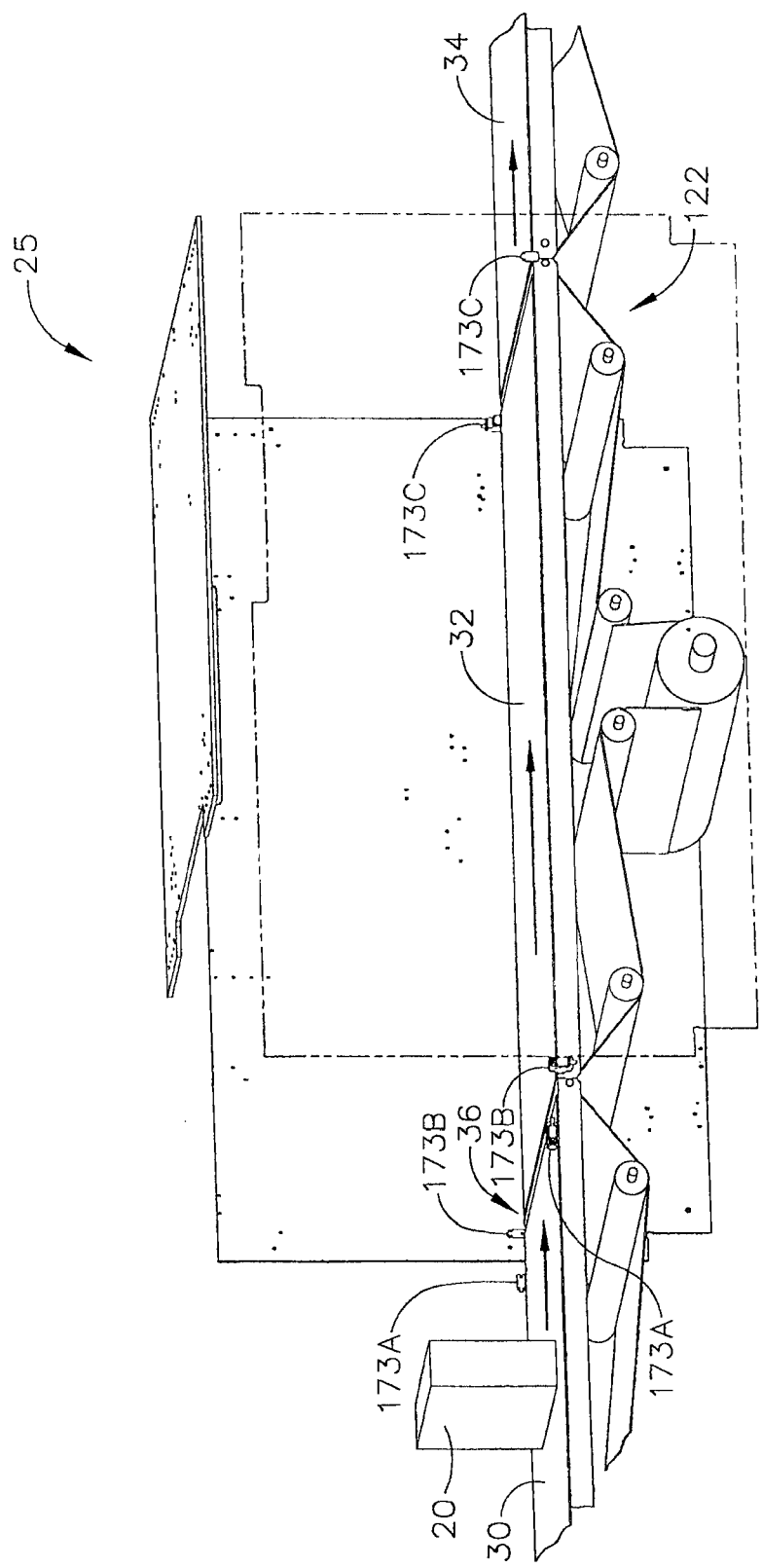
FIG. 5A is an oblique cutaway left side view of an embodiment of a system for item identification.

As seen in FIG. 5A, a transport location sensor includes, but is not limited to, an in-feed conveyor belt 30, a sensing volume conveyor belt 32, an out-feed conveyor belt 34, and a transport location physical sensor 122.

A weight sensor, also seen in FIG. 5A, includes, but is not limited to, at least one load cell (175A-D in FIG. 12), previously mentioned in the context of FIG. 2B. In an embodiment, the weight sensor includes four load cells. The set of four load cells supports the sensing volume conveyor belt 32 and its associated mechanical structure (motor, rollers, the belt, etc.). In some embodiments, the weight sensor also includes three object sensors, shown herein as an in-feed conveyor belt object sensor 173A, a sensing volume entrance object sensor 173B, and a sensing volume exit object sensor 173C. In some embodiments, each object sensor is placed about two tenths of an inch above the transport location sensor 122. In some embodiments, the object sensors are light sources and photodetector pairs in which the optical path between the light source and the photodetector is interrupted in the presence of an object, such as item 20. Other object sensors are well known in the art, and can be used depending on the specific application contemplated.

Item 20 is transported toward the sensing volume along the in-feed conveyor belt 30 of the transport location sensor. In an embodiment, as the item 20 approaches the sensing volume, the in-feed conveyor belt object sensor 173A detects that item 20 is about to enter the sensing volume. Item 20 passes over belt gap 36 as it is transferred from in-feed conveyor belt 30 to sensing volume conveyor belt 32, and the sensing volume entrance object sensor 173B ascertains that the item 20 has entered the sensing volume. Similarly, the sensing volume exit object sensor 173C detects when item 20 exits the sensing volume and is transferred from sensing volume conveyor belt 32 to out-feed conveyor belt 34. However, the existence and particular location of each object sensor varies depending on the specific application contemplated.

When, as in FIG. 5A, no items are located on sensing volume conveyor belt 32, the load cells measure the total weight of the sensing volume conveyor belt 32. Then, as one or more items 20 are transferred to the sensing volume conveyor belt 32, the load cells measure the weight of the sensing volume conveyor belt 32 and the weight of the one or more items 20. Each load cell converts the force (weight) into a measurable electrical signal, which is read out as a load cell voltage. Since the electrical signal output of each load cell is on the order of millivolts, the signals of the load cells are amplified and digitized by load cell amplifiers (not shown).

Figure 5B:
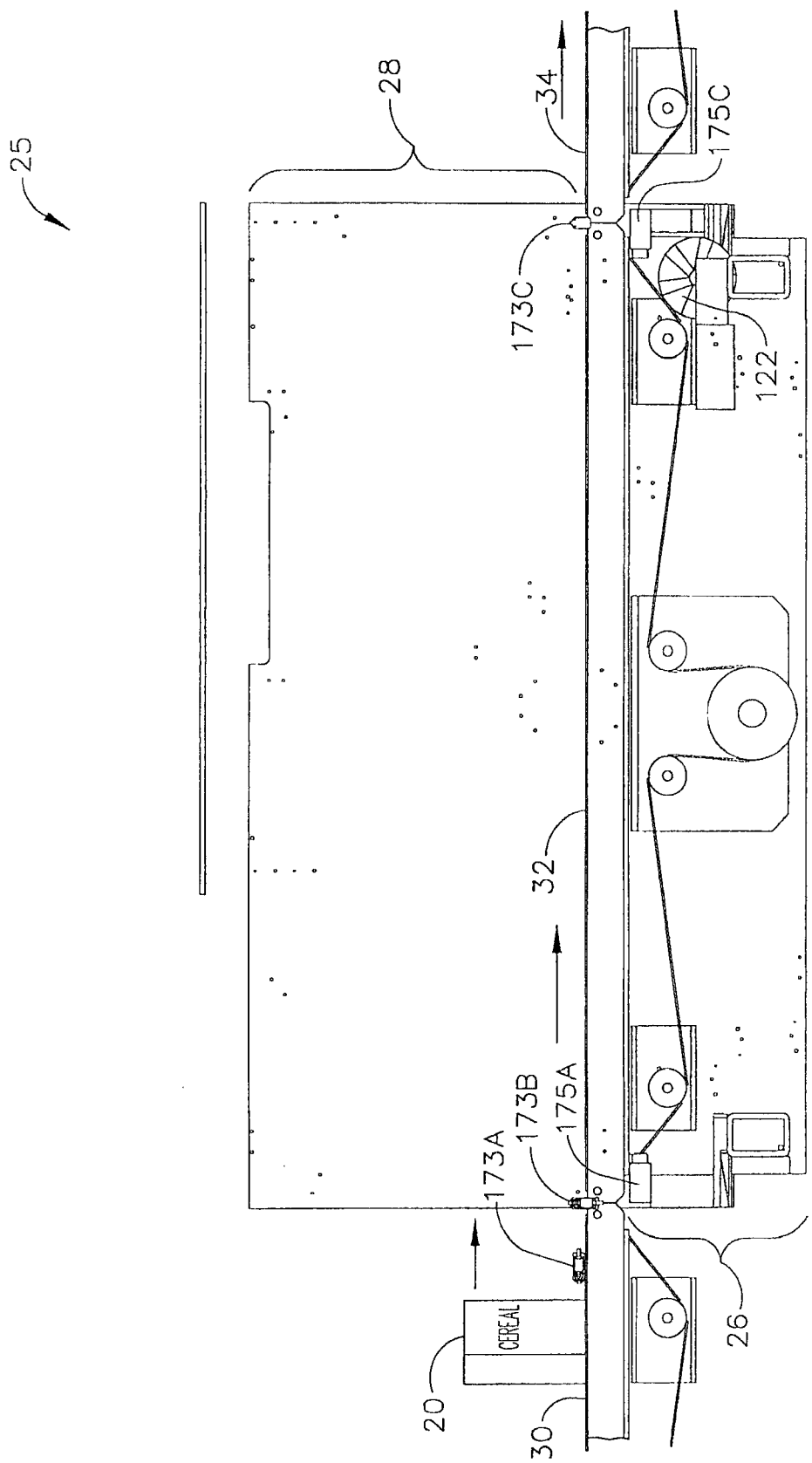
FIG. 5B is a cutaway left elevation view of an embodiment of a system for item identification.

As seen in FIG. 5B, the weight sensor includes, but is not limited to, the set of object sensors (173A, 173B, and 173C) and the load cells. The sensing volume entrance object sensor 173B is located just inside the upper housing 28 of the sensing volume and above the belt gap (indicated in FIG. 4A by reference number 36) between in-feed conveyor belt 30 and sensing volume conveyor belt 32. Similarly, the sensing volume exit object sensor 173C is located just inside the upper housing 28 of the sensing volume and above the out-feed conveyor belt 34. The in-feed conveyor belt object sensor 173A is located above the in-feed conveyor belt 30 upstream of the sensing volume. While FIG. 5B depicts the in-feed conveyor belt object sensor 173A as being close to the sensing volume, the distance between the in-feed conveyor belt object sensor 173A and the sensing volume can vary depending on the specific application contemplated.

Figure 12:
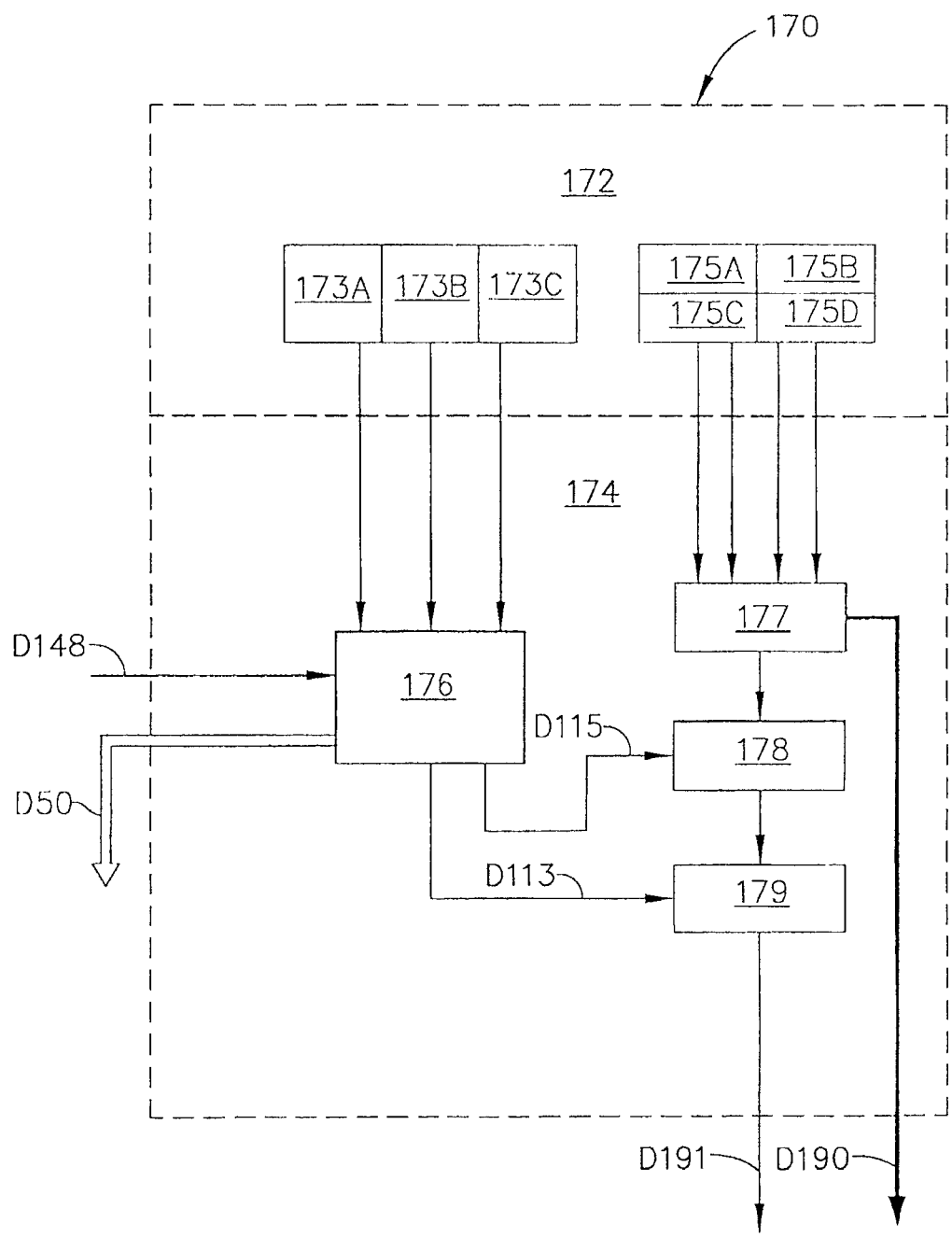

FIG. 5B also shows that load cells 175A and 175C are located inside the lower housing 26 of the sensing volume. Load cells 175B and 175D (as depicted in FIG. 12) are not visible in this view as they are blocked by load cells 175A and 175C, respectively. The load cells support sensing volume conveyor belt 32 and its associated mechanical parts, enabling the set of load cells to measure the weight of the sensing volume conveyor belt 32 and items thereon, if any.

As seen in FIG. 5B, the transport location physical sensor 122, in the illustrated embodiment a rotary encoder, is located close to a load cell 175C. The transport location physical sensor 122 is connected to the sensing volume conveyor belt 32 and a digital counter in one of the system processors. As the sensing volume conveyor belt 32 is rotated by the motor, the encoder wheel turns, allowing the transport sensor processor to record the movement of the sensing volume conveyor belt 32. The displacement of the conveyor belt from an arbitrary starting location is defined as the transport system location. The transport sensor processor generates the transport system location on the conveyor belt for each transport sensor pulse generated by the transport locations physical sensor 122, though as mentioned above, in practice a number of sensor pulses may together constitute a system count, in order to provide appropriate intervals. The signals from the transport location physical sensor 122 are also used to trigger the line-scan cameras described herein to take images. In an embodiment, the transport system location is the along-track co-ordinate of the item, wherein the along-track co-ordinate system is established in keeping with a virtual sensing volume conveyor belt that is infinitely long. When the system 25 receives the object position of the item 20 from the in-feed conveyor belt object sensor 173A it generates the transport system location corresponding with the along-belt co-ordinate of the item 20.

Figure 6A:
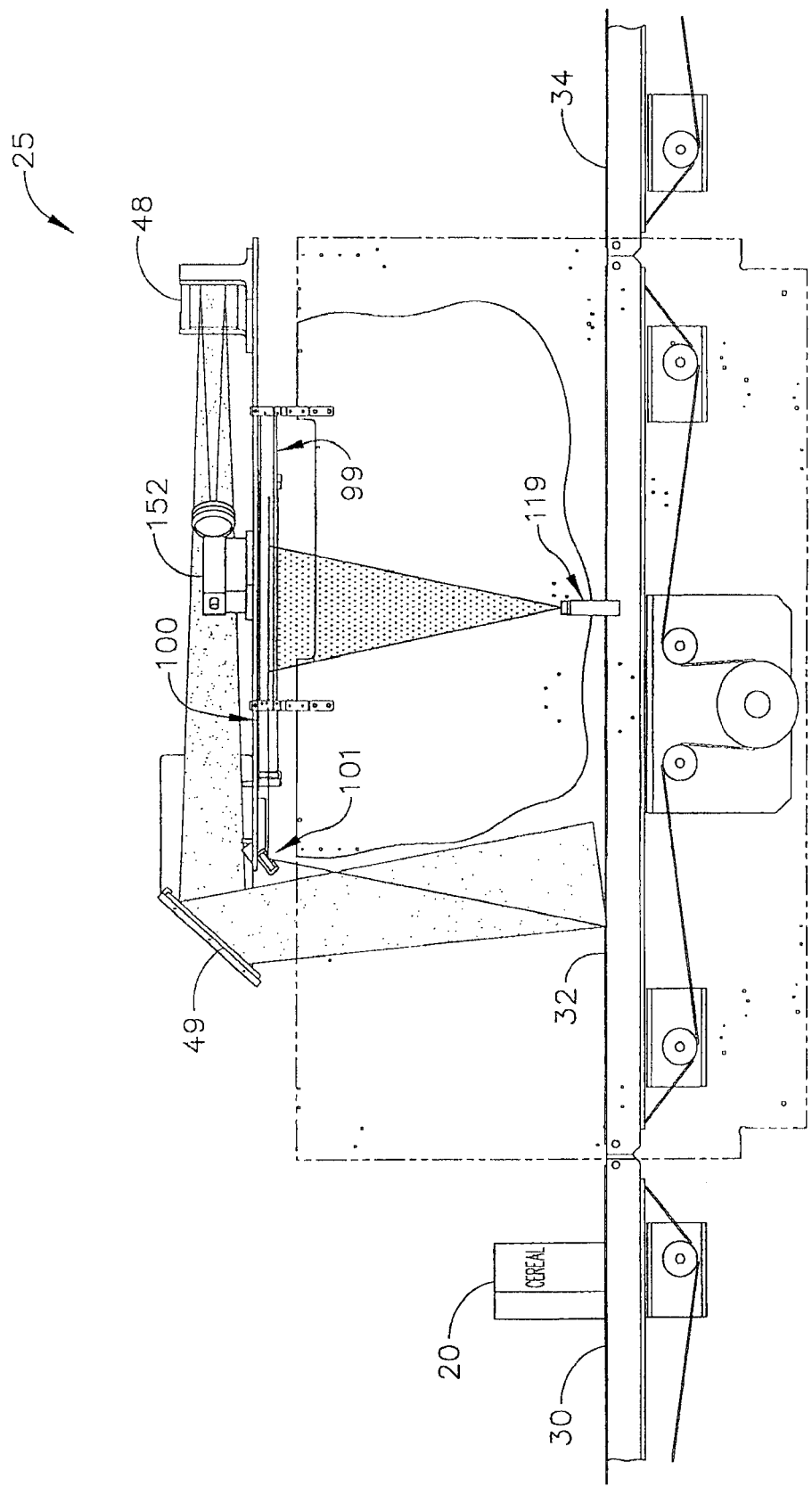
FIG. 6A is a cutaway left elevation view of an embodiment of a system for item identification.
Figure 6B:
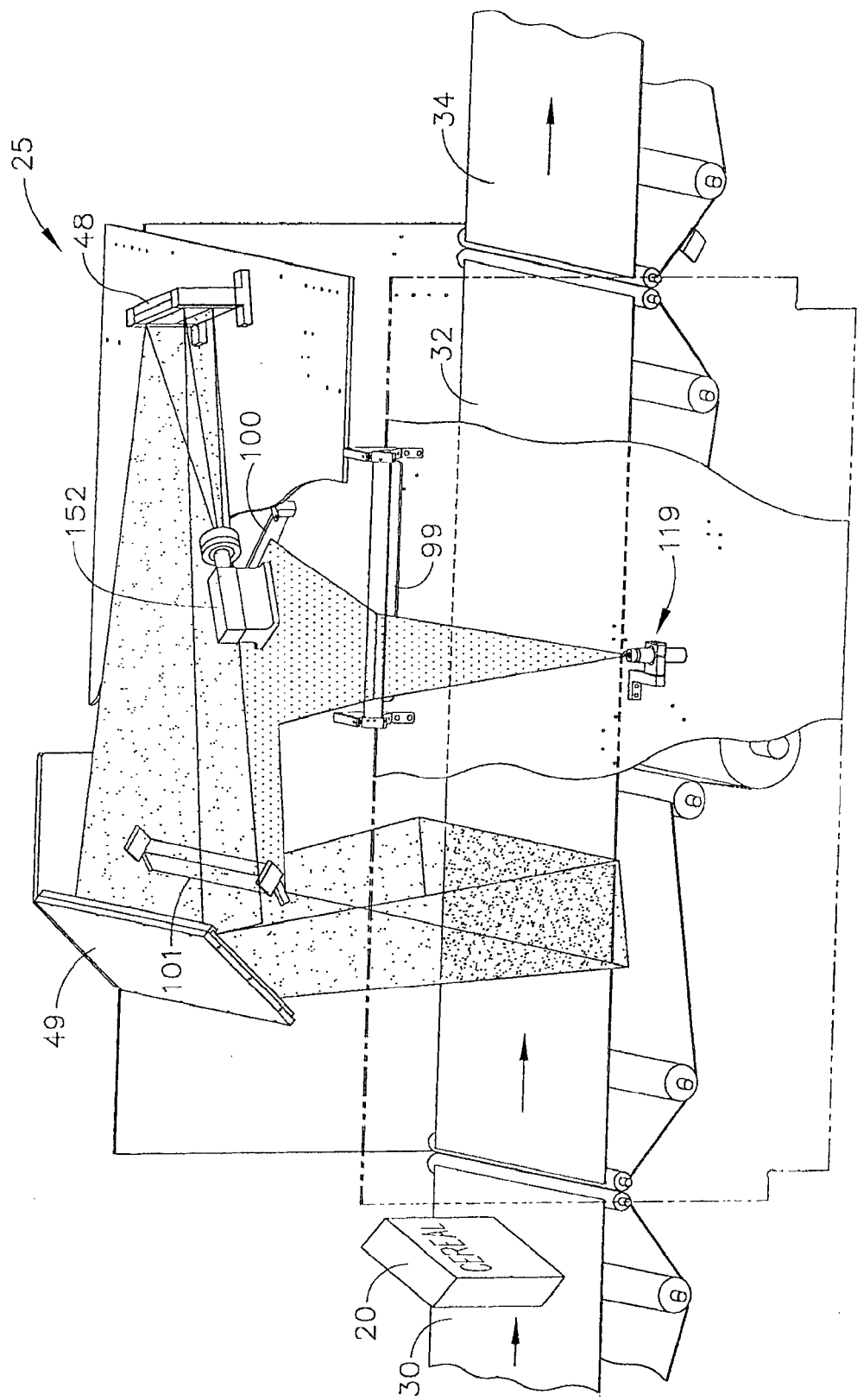
FIG. 6B is an oblique cutaway top view of an embodiment of a system for item identification.

As illustrated in FIGS. 6A and 6B, an embodiment of the dimension sensor includes, but is not limited to, a laser stripe generator 119, at least one laser minor (shown herein as a first laser mirror 99, a second laser mirror 100 and a third laser mirror 101), an area camera 152, one or more area camera mirrors (shown herein as first area camera minor 48 and second area camera minor 49), an upward looking line-scan camera (shown with reference number 88 in FIGS. 4A and 4B), and at least one parameter processor (not shown) for processing the parameter values generated from the area-camera images from the area camera 152 and line-scan data from the upward looking line-scan camera.

Laser stripe generator 119 projects a laser stripe upward to the first laser mirror 99. As will be appreciated, a number of types of optical elements are capable of converting a laser beam into a stripe, including, for example, a cylindrical lens, a prism, conic mirrors, or other elements may be used. The laser stripe is reflected from the first laser mirror 99 to the second laser mirror 100 and onto the third laser mirror 101. The third laser minor 101 projects the laser stripe downward from the top of the sensing volume onto the sensing tunnel conveyor belt 32. In a particular embodiment, laser stripe generator 119 uses a holographic optical element and a laser diode to generate the laser stripe. In an embodiment, the laser diode is an infrared laser diode, and the area camera 152 is a CCD camera configured to detect infrared radiation. In a particular embodiment, a low pass filter or a band pass filter configured to preferentially allow infrared radiation to pass while attenuating an amount of visible light is placed over the CCD.

Item 20 is transported through the system from left to right along the transport system in the direction of motion from the in-feed conveyor belt 30 to the sensing volume conveyor belt 32 to the out-feed conveyor belt 34. It is transferred from in-feed conveyor belt 30 to sensing volume conveyor belt 32, which transports it through the sensing volume. Area camera 152 has a pyramid-shaped field of view which looks down on sensing tunnel conveyor belt 32 after it is folded by first area camera minor 48 and second area camera mirror 49. While the field of view of area camera 152 is depicted in FIGS. 6A and 6B as being folded by first and second area camera minors 48 and 49, the number of minors used to fold the field of view of area camera 152 is merely by way of example, and can vary depending on the specific application contemplated. The laser stripe is projected onto the sensing volume conveyor belt 32 within the field of view of area camera 152. Item 20 is transported through sensing volume on sensing volume conveyor belt 32, passing through the point at which the laser stripe is projected onto the sensing volume conveyor belt 32 from above. At that point, the area camera captures area-camera images of item 20 and the laser stripe reflecting off of the item.

Figure 7A:
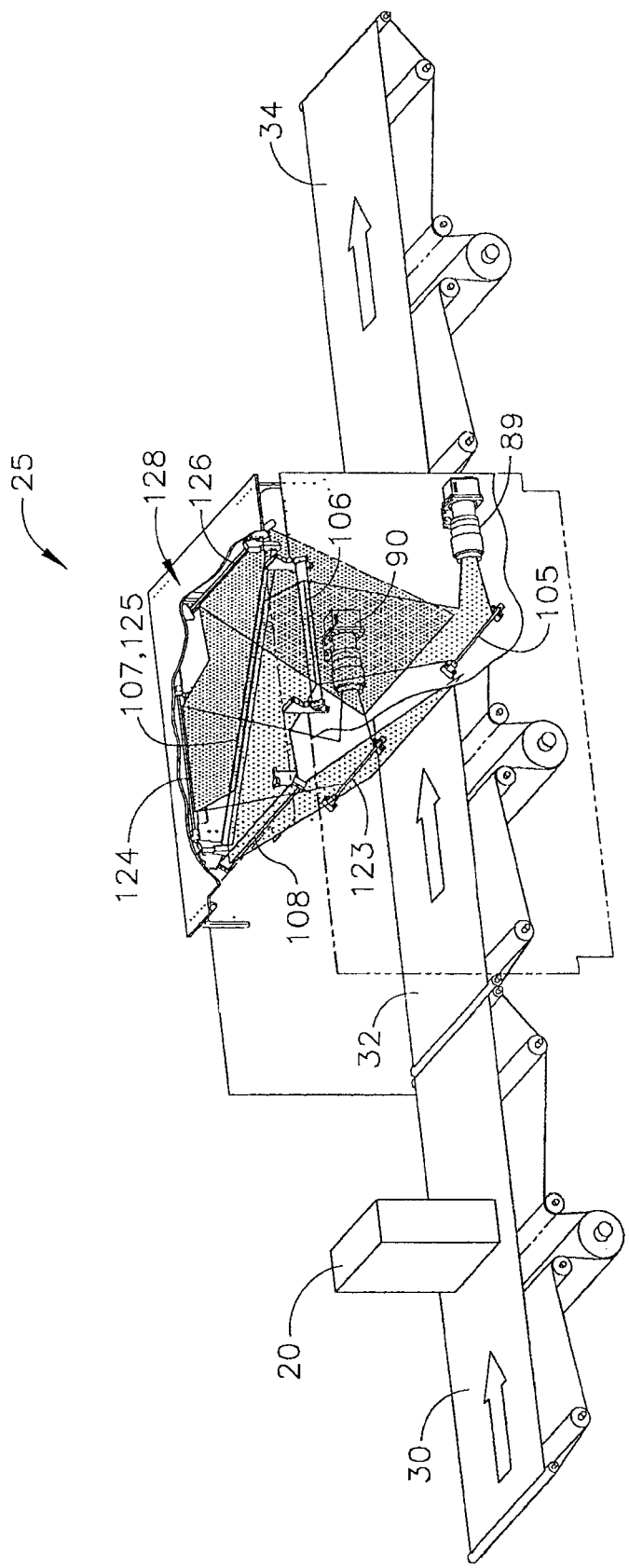
FIG. 7A is an oblique cutaway left side view of an embodiment of a system for item identification.

In the embodiment illustrated in FIG. 7A, the system 25 includes a left-side downward looking line-scan camera 89 and a right-side downward looking line-scan camera 90. The field of view of left-side downward looking line-scan camera 89 is folded by left-side downward looking line-scan camera mirrors (first left-side downward looking line-scan camera mirror 105, second left-side downward looking line-scan camera mirror 106, third left-side downward looking line-scan camera mirror 107, and fourth left-side downward looking line-scan camera mirror 108) before being projected down onto sensing volume conveyor belt 32 at an angle that captures the top side of item 20 and the back-side of item 20 as the item 20 passes through the sensing volume front-side first from the in-feed conveyor belt 30 to the sensing volume conveyor belt 32 to the out-feed conveyor belt 34, as shown in the illustrated embodiment.

The field of view of right-side downward looking line-scan camera 90 is folded by right-side downward looking line-scan camera mirrors (first right-side downward looking line-scan camera mirror 123, second right-side downward looking line-scan camera mirror 124, third right-side downward looking line-scan camera mirror 125, and fourth right-side downward looking line-scan camera mirror 126) before being projected down onto sensing volume conveyor belt 32 at an angle that captures images of the top side of item 20 and the front-side of item 20 as the item 20 passes through the sensing volume front-side first.

Right-side downward looking illumination source 128 provides an intense illumination of the sensing volume conveyor belt 32 with low divergence, allowing right-side downward looking line-scan camera 90 to yield a high-contrast image. Similarly, left-side downward looking illumination source (not shown in FIG. 7A) provides an intense illumination of the sensing volume conveyor belt 32 with low divergence, allowing left-side downward looking line-scan camera 89 to yield a high-contrast image.

Figure 7B:
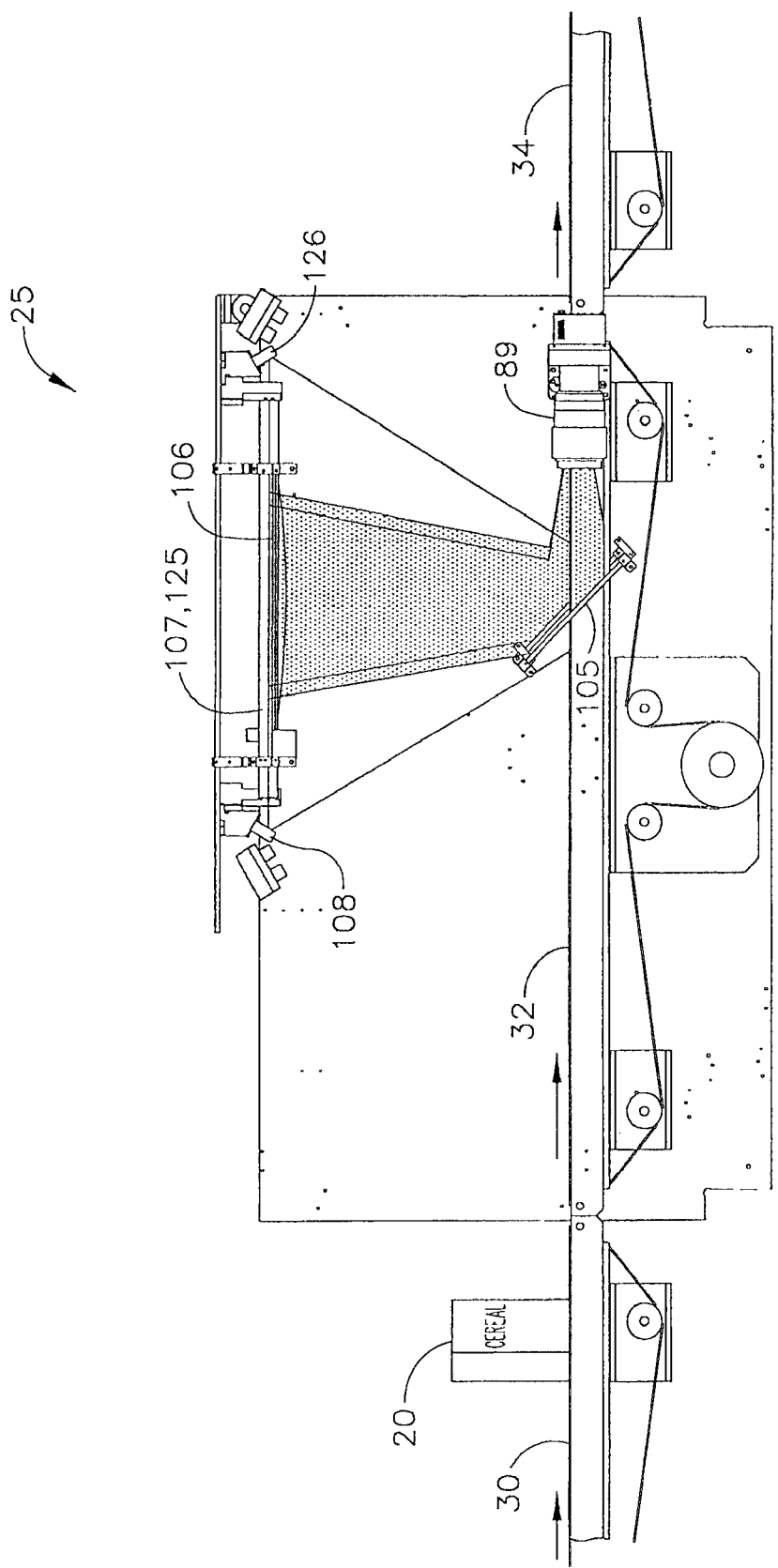
FIG. 7B is a cutaway left elevation view of an embodiment of a system for item identification.

As shown in FIG. 7B the field of view of left-side downward looking line-scan camera 89 is folded first by first left-side downward looking line-scan camera mirror 105, then by second left-side downward looking line-scan camera mirror 106. It is then further folded by third left-side downward looking line-scan camera mirror 107 and fourth left-side downward looking line-scan camera mirror 108. Fourth left-side downward looking line-scan camera mirror 108 projects the field of view of left-side downward looking line-scan camera 89 down onto the sensing volume conveyor belt 32. Item 20 is transported along in-feed conveyor belt 30 onto sensing volume conveyor belt 32 which will transport the item 20 through the sensing volume after it completes its journey over the in-feed conveyor belt 30. As item 20 is transported through the sensing volume, it is brought into the field of view of left-side downward looking line-scan camera 89, and the left-side downward looking line-scan camera 89 captures images in the form of line-scan data of the item 20.

Similarly, the field of view of right-side downward looking line-scan camera is folded first by first right-side downward looking line-scan camera mirror, then by second right-side downward looking line-scan camera mirror. It is then further folded by third right-side downward looking line-scan camera mirror 125 and fourth right-side downward looking line-scan camera mirror 126. Fourth right-side downward looking line-scan camera mirror 126 projects the field of view of right-side downward looking line-scan camera down onto the sensing volume conveyor belt 32. As item 20 is transported through the sensing volume, it is brought into the field of view of right-side downward looking line-scan camera, and the right-side downward looking line-scan camera captures images, line-scan data, of the item. Once the item 20 has completed its journey over the sensing volume conveyor belt, it passes onto the out-feed conveyor belt 34. In some embodiments, some parameter sensors are able to continue sensing the item 20 as it travels on the out-feed conveyor belt 34.

Information/Data Flow

Figure 8:
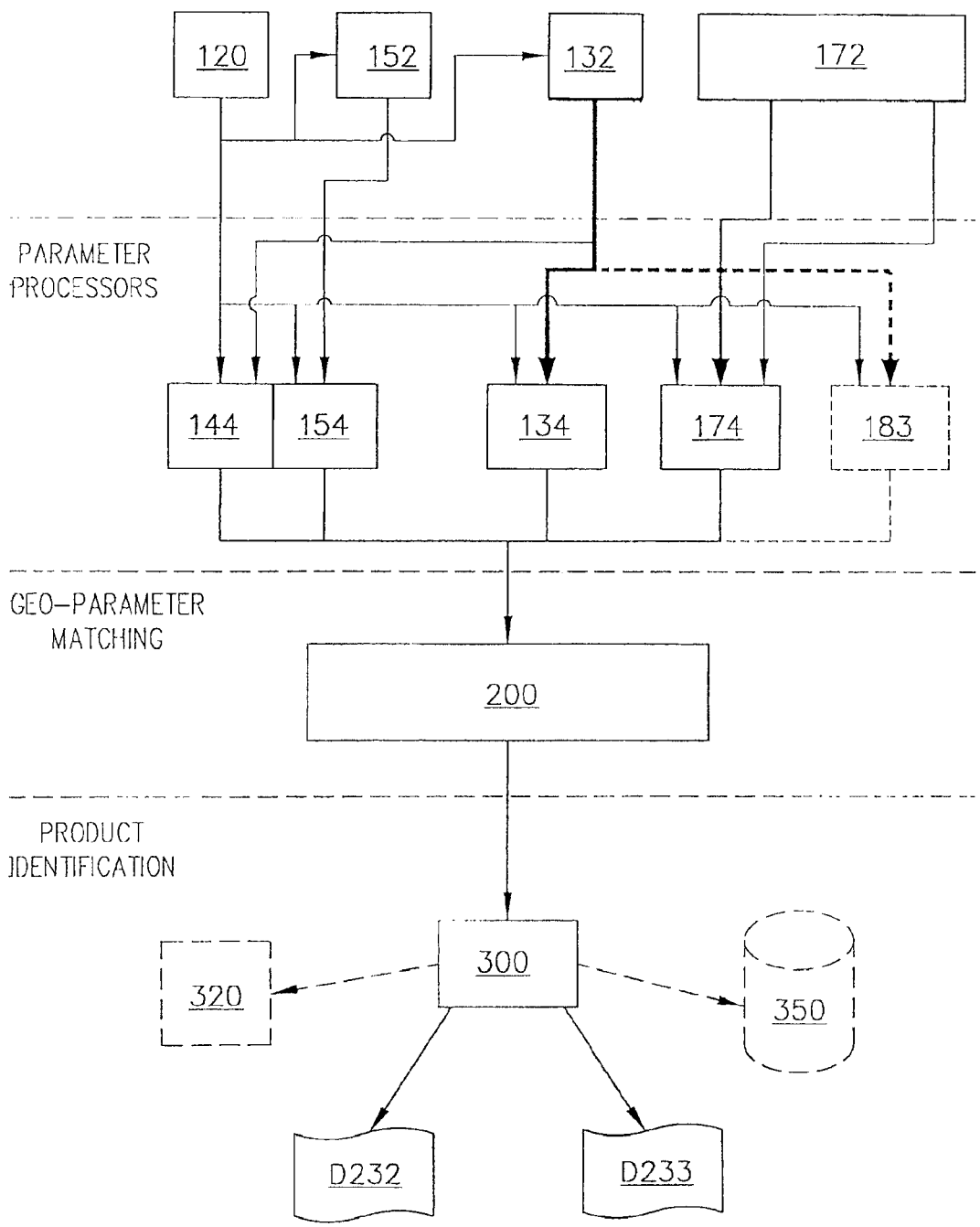
FIGS. 8-12 are data flow diagrams illustrating data flow through an embodiment of a system for item identification and its subsystems.

FIG. 8 illustrates a dataflow for use in an embodiment of a system 25, organized as moving from top horizontal slices to bottom horizontal slices of an asynchronous, data driven architecture of the system. That is, in the embodiment, there may be no universal clock within the system, sensors and processors output their results as soon as the data is available, and the data flows are, in general, unidirectional. In an embodiment, information is conveyed between processes by TCP/IP network messages, and within processes via shared memory.

Figure 9:
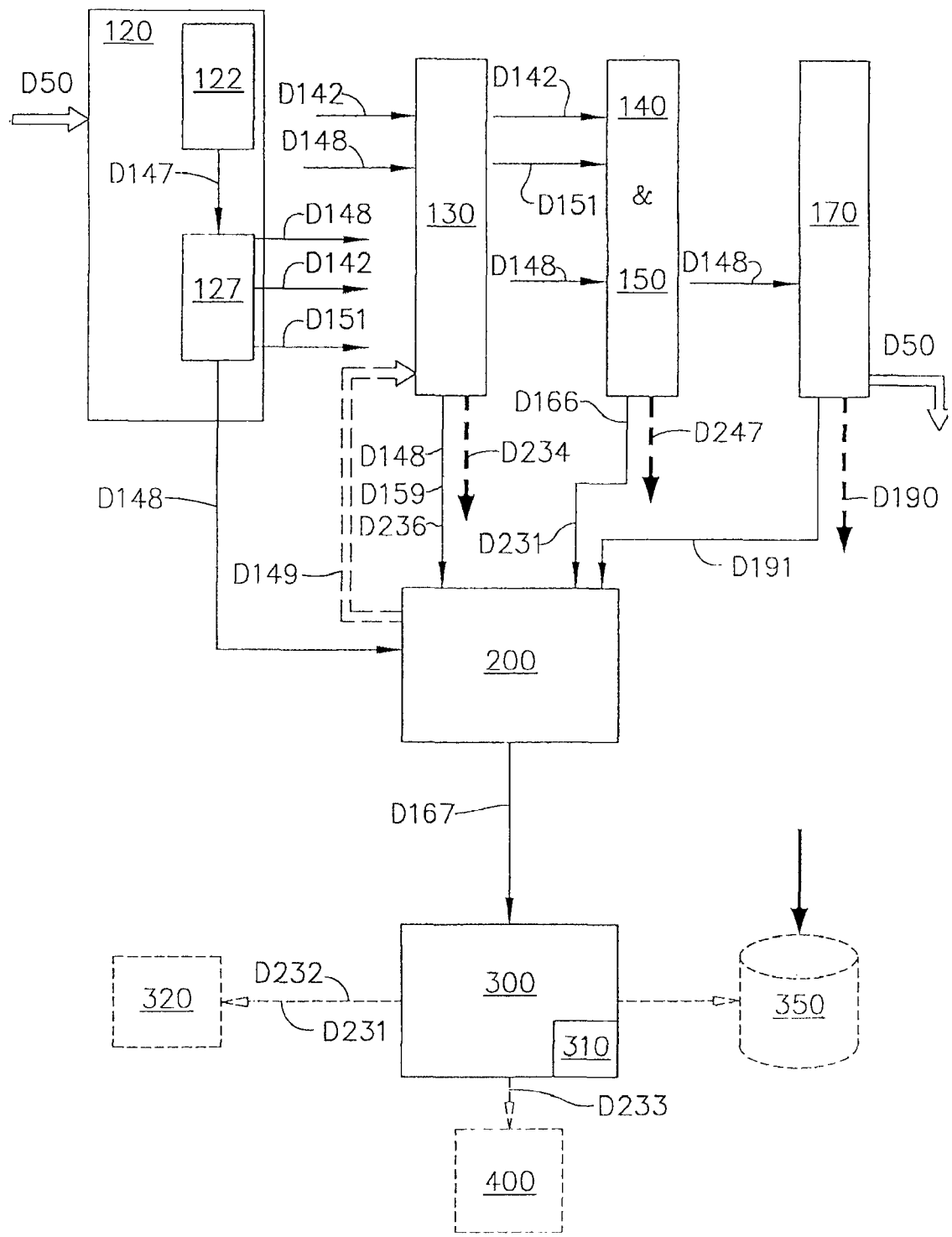

As will be discussed in greater detail below, FIG. 9 illustrates the same elements grouped in parallel, sensing sensors/processes, namely a transport location sensor 120, one or more indicia reader(s) 130, a dimension sensor 150, an item isolator 140, and a weight sensor 170, to emphasize that each physical sensor and associated parameter processor may operate autonomously from the other physical sensors and parameter processors. FIG. 8, on the other hand, is organized so that data flows from the data source level to the parameter processor level to the geo-parameter matching level to the final stage, product identification, which is the stage where the items that have been sensed in the sensing volume are either identified as products or flagged as exceptions. Each level in the hierarchy of an embodiment will be addressed in turn below.

Data Sources

The first data source is a transport system location sensor 120, typically comprising a transport system location physical sensor 122 and a transport sensor processor 127, as shown in FIG. 9. In one embodiment, transport system location physical sensor 122 is a rotary encoder attached to a belt roller. As shown in FIG. 9, the initial sensing data from transport system location physical sensor 122 is a count increment, the transport sensor pulse D147 (each of which may represent more than one sensor pulse), which is sent to a transport sensor processor 127. Transport sensor processor 127 performs a simple summation and scaling process to convert transport sensor pulses D147 into transport system location values D148. Transport system location values are distributed to each of the other parameter processors so that the parameter processors can associate a transport system location with each measured parameter value. In some embodiments, transport sensor processor 127 also uses the transport sensor pulses D147 to generate line-scan camera trigger signals D142 and area camera trigger signals D151 for the various line-scan cameras 132 and an area camera 152 respectively. By triggering the cameras based on transport system movement, rather than at fixed time intervals, the system may avoid repeatedly recording images of the same field.

The second data source illustrated in FIG. 8 is area camera 152. Area camera 152 is positioned to observe the path of a line of laser light projected downward towards sensing volume conveyor belt and any items thereon. As described previously, there is a known angle between the laser projector and the area camera which causes the image of the line of laser light in the camera to be displaced perpendicular to the line, in proportion to the height of the item on which the line is projected. The data from area camera 152 is sent to item isolating parameter processor 144 and dimension estimator 154.

The third data source illustrated in the system illustrated in FIG. 8 is a set of line-scan cameras 132. The primary function of the line-scan cameras 132 is to provide input to indicia parameter processor(s) 134. In an embodiment there are eleven line-scan cameras 132, which have been determined by the inventors to provide full coverage of the sensing volume, with adequate imaging resolution. Other embodiments can be implemented with fewer or greater numbers of line-scan cameras, depending on the performance goals of the designer, the size and shape of the sensing volume, the resolution of the cameras and other factors.

The fourth illustrated data source is an in-motion scale 172 comprising, in an embodiment, three object sensors 173A, 173B and 173C (shown in at least FIG. 5B) and four analog load cells 175A, 175B, 175C, and 175D (shown in at least FIG. 12). The load cells are disposed in the load path supporting the sensing volume conveyor belt. Each load cell generates an electrical signal in proportion to the compression force applied the load cell. The signals from all the load cells and all the object sensors are sent to weight generator 174.

The data sources described above are included in one particular embodiment and should not be construed as exhaustive. Other data sources can easily be included in a system of this type, depending on the parameters to be monitored. For example, infrared sensors could provide measurements of item temperature or color imagers could be used as data sources to measure a spatial distribution of colors on package labels.

Parameter Processors

Returning to FIG. 8, the second stage of the data flow architecture contains the parameter processors. Each data source has one or more associated parameter processor(s) to transform the initial sensing data into a parameter value, which are then used by an item identification processor to identify the item. In an embodiment, these parameter processors comprise an item isolating parameter processor 144, a dimension estimator 154, an indicia parameter processor 134, and a weight generator 174. In FIG. 8, an optional image processor 183 is depicted as a parameter processor.

The first processor shown in FIG. 8 is the item isolating parameter processor 144. Functionally, item isolating parameter processor 144 includes an item distinguishing system, an item locator and an item indexer. The item isolating parameter processor 144 allows the system to operate on multiple items in close proximity to each other in the sensing volume. The item isolating parameter processor 144, in some embodiments, uses data collected near the entrance to the sensing volume and performs four functions:

A. first, the item isolating parameter processor 144 recognizes that an object (which may be one or more items) has entered the sensing volume;

B. second, the item distinguishing system determines how many distinct items make up the object that entered the sensing volume;

C. third, the item indexer assigns a Unique Item Index value (UII) to each distinct item. The UII is simply a convenient name for the particular item; and D. fourth, the item locator associates a two-dimensional location in the plane of the bottom of the sensing volume (for example, the plane of the conveyor belt) with each item that has been identified and assigned a UII.

If all items entering the sensing volume are well separated in the along-transport direction (i.e., they are singulated), there may be no need for the item isolating parameter processor 144, as all parameter values will be associated with the only item in the sensing volume. When items are not singulated, however, the item isolating parameter processor 144 determines how many items are in close proximity to each other and assigns each item a UII associated with its transport system location.

Item isolating parameter processor 144 outputs a UII and transport system location D148 when it has isolated an item. The unique item index (UII) value, as its name suggests, may simply be a sequentially generated index number useful for keeping track of the item. This data is provided to dimension estimator 154 and an item description compiler 200.

Although item isolation may be a separate logical function in the system, the computer processing embodiment of item isolating parameter processor 144 in particular embodiments may work in close conjunction with dimension estimator 154, with internal data being transferred back and forth between the functions. The item isolating parameter processor 144 in this approach functions as part of the dimension estimator 154 processing to recognize the difference between one large item and an aggregation of multiple smaller close together items, and to instruct the dimension estimator 154 to estimate the dimensions of the one or more than one item respectively.

The dimension estimator 154 receives data from area camera 152, from a selected line-scan camera 132 (the upward-looking camera in one embodiment) and from the transport sensor processor, which includes the transport system location sensor 120. In addition, working in conjunction with the item isolating parameter processor 144, dimension estimator 154 receives information about how many items are in the area camera's field of view and where they are. It will be understood that while isolation and dimensioning may be logically distinct functions, they may share a number of processing operations and intermediary results and need not be entirely distinct computer processes.

In one embodiment, dimension estimator 154 estimates the length, height, and width of the dimensions of the item, ignoring the fact that the item may have a complex (non-rectangular) shape. That is, in this approach, estimator 154 calculates a smallest rectangular box into which the item would fit. The dimension estimator 154 can be configured to estimate parameter values regarding the general shape of the item (cylindrical, rectangular solid, necked bottle shape, etc.), the item's orientation on the transport system, and details concerning the item's three-dimensional coordinates in the sensing volume. The calculated parameter values, along with the transport system location of the item to which they apply, are sent to the item description compiler 200 as soon as they are calculated.

There is one indicia parameter processor 134 associated with each line-scan camera 132. Together they form an indicia reader 130, as shown in greater detail in FIG. 10. As will be appreciated, the indicia parameter processors may be individual devices or may be virtual processors, for example respective modules running on a common processor. Indicia parameter processor 134 examines the continuous strip image produced by line-scan camera 132 until it identifies the signature of an indicium (typically a bar code such as a UPC). Furthermore, the indicia parameter processor 134 attempts to convert the indicia image into the underlying code, which can later be compared by the item description processor with the product description database to determine a product code that uniquely identifies the product. In addition to outputting the product code to the item description compiler 200, the indicia parameter processor 134 outputs the apparent location of the indicia in camera-centric coordinates.

As will be appreciated, additional methods are available for determining an indicia parameter. For example, many bar codes include numerical indicia in addition to the coded numbers that make up the code. In this regard, optical character recognition (OCR) or a similar approach may be used to recognize the numbers themselves, rather than decoding the bars. In the case where the indicia are not bar codes at all, but rather written identifying information, again OCR may be employed to capture the code. In principle, OCR or other word recognizing processes could be used to read titles or product names directly as well.

Where, as with bar codes, there are a limited number of possible characters and a limited number of fonts expected to be encountered, simplifying assumptions may be made to assist in OCR processes and allow for a character matching process. A library may be built, incorporating each of the potential characters or symbols and rather than a detailed piece-by-piece analysis of the read character shape, the shape can be compared to the library members to determine a best match.

Furthermore, because in a typical environment there are fewer likely combinations than there are possible combinations, it is possible that a partially readable code can be checked against likely codes to narrow down the options or even uniquely identify the code. By way of example, for a retailer stocking tens of thousands of items, each having a 10 digit UPC, there are $10^{10}$ possible combinations but only $10^4$ combinations that actually correspond to products in the retailer's system. In this case, for any given partially read code, there may be only one or a few matches to actual combinations. By comparing the partial code to a library of actually-in-use codes, the system may eliminate the need to generate an exception, or it may present an operator with a small number of choices that can be evaluated, which may be ranked by order of likelihood based on other parameters or other available information. Alternately, the partial match information may be passed as a parameter to the product identification module and evaluated along with other information to determine the correct match. In an embodiment, more than one bar code reader software module may be employed using different processing algorithms to process the same read data, and the results from each module can be compared or otherwise integrated to arrive at an agreed upon read, or on a most-likely read where there is no agreement.

For weight parameters, the in-motion scale 172 generates a signal proportional to the sum of the weights of the items on the scale. For singulated items, where only one item is in the active sensing volume at a time, the weight generator 174 may sum the signals from the in-motion scale 172, the load cells in the illustrated embodiment, and apply a transformation to convert voltage to weight. For non-singulated items, where more than one item can be in the sensing volume simultaneously (i.e., closely spaced along the sensing volume conveyor belt), weight generator 174 has two opportunities to estimate the weight of individual items: immediately after the item enters the sensing volume, and immediately after the item exits the sensing volume. The object sensors of the in-motion scale 172 are provided to inform weight generator 174 when items have entered or exited the in-motion scale 172. The object sensors are incorporated into the in-motion scale 172 so its operation may be conducted independently of other parameter sensors.

As with the data sources, this list of parameter processors listed above is by way of example, not an exhaustive listing. For instance, FIG. 8 includes an optional image processor 183. Furthermore, it should be appreciated that any one of the parameter processors described herein may be omitted in particular embodiments. For example, where the size, shape and indicia parameters are sufficient to identify objects in the sensing volume, there may be no need to include weight parameters.

Geometric-Parameter Matching

Geometric-parameter matching is the process of using the known geometry of the various physical sensors and the fields-of-view at which they collected their initial sensing data to match the measured parameter values with the item to which the parameter values apply. The item description compiler 200 is the processor that collects all the asynchronous parameter data and makes the association with the appropriate item. As the name suggests, the output of the item description compiler 200 may be referred to as an item description associated with the item. The item description is a compilation of parameter values collected by parameter processors for an item measured in the sensing volume.

After the item description compiler 200 has built an item description for a particular item, the item description may be passed to an item identification processor 300, which performs the product identification function. In practice, while there may be a number of available item description fields, it is possible to identify items without completing every field of the item description. For example, if a weight measurement was too noisy or the indicium was hidden from view, smudged, or otherwise unreadable, the item description may still be sent to the item identification processor 300 rather than being stuck at the geometric-parameter matching level at the item description compiler 200. The item description compiler 200 can decide, for example, that having only the digital indicia data is enough data to pass on to the item identification processor 300, or it can determine that the item has moved out of the sensing volume and no more parameter values will be forthcoming from the parameter processors.

Product Identification

By way of example, item identification processor 300 may receive an item description from item description compiler 200. Using the parameter values data in the item description, the item identification processor forms a query to a product description database, which in turn returns a product identification and a list of the expected parameter values for that product, along with any ancillary data (such as standard deviations on those parameter values).

Item identification processor 300 decides if the item matches the product with a high enough degree of certainty. If the answer is yes, the product identification datum D233 is output; if the answer is no, the item may be identified with an exception flag D232. The identification/exception decision logic can vary from simple to complex in various embodiments. At the simple end of the logic scale the item identification processor could flag any item for which the weight did not match the weight of the product described by the UPC. At the complex end of the logic scale the item identification processor can incorporate fuzzy logic which is a form of non-Boolean algebra employing a range of values between true and false that is used in decision-making with imprecise data, as in artificial intelligence systems.

Optionally, various exception handling routines 320 can be invoked. These routines can be as rudimentary as doing nothing or lighting a light for a human to observe, or they can be more complex. For example, item identification processor 300 could be instructed to act as though the read indicium is in error by one or more digits and to re-query the product description database with variations on the read indicium.

Optionally, each successful product identification can be used to update the product description database. That is to say, every successful identification increases the statistical knowledge of what a product looks like to the system 25. Also optionally, information relating to exception flags D232 can also be added to the history database 350 for improvement of the system 25.

Asynchronous Information Flow and Processing System

FIG. 9 illustrates an embodiment of a data flow for the same elements as shown in FIG. 8, with a slightly different notional grouping and arrangement. The illustrated data sources are a transport location sensor 120, one or more indicia reader(s) 130, a dimension sensor 150, an item isolator 140, and a weight sensor 170, to emphasize that each physical sensor and associated parameter processor operates autonomously from the other physical sensors and parameter processors.

The transport system location sensor 120, in some embodiments, includes the transport system location physical sensor 122 and a transport sensor processor 127. In some embodiments, such as the one shown in FIG. 9, the transport location physical sensor 122 takes the form of a rotary encoder associated with a belt roller. The initial sensing data from transport system location physical sensor 122 is a count increment, the transport sensor pulse D147, which is sent to the transport sensor processor 127. The transport sensor processor 127 then performs a summation and scaling process to convert transport sensor pulses D147 to transport system location values D148. As described above, the system may treat the conveyor belt as being essentially continuous and the transport system location is essentially the distance along the (continuous) conveyor belt from some arbitrary starting point.

In a particular embodiment, this distance is measured in increments of about five-thousandths of an inch, and may be referred to as an x-coordinate. In an embodiment, transport sensor processor 127 also uses the transport sensor pulses D147 to generate line-scan trigger signals D142 and area camera trigger signals D151 for the various line-scan cameras and an area camera respectively. By triggering the cameras based on transport system movement, rather than at fixed time intervals, the system 25 may avoid repeatedly recording images of the same field. Thus, the output of the transport sensor processor 127 includes the line-scan trigger D142, the area camera trigger D151, and the transport system location D148.

Aside from a set of conventional dedicated motor controllers, transport sensor processing includes converting input belt commands D50 (e.g., stop, start, speed) received from the weight sensor 170, into motor controller signals; converting the transport system sensor pulses D147 into a transport sensor location values D148; and transmitting that value to the various parameter processors, including without limitation the item isolating parameter processor 144, the dimension estimator 154, the indicia parameter processor 134, the weight generator 174, and, optionally, the image processor 183, wherein each parameter process may be as illustrated and described in relation to FIG. 8, above.

It will be noted that transport sensor processor 127 may communicate directly with the various cameras to send them frame triggers.

The transport system location D148 output from the transport system location sensor 120 is provided to the item isolator 140, the dimension sensor 150, the indicia reader 130, the weight sensor 170, any optional image processors 183 (shown in FIG. 8), and the item description compiler 200.

A set of one or more line-scan cameras, which are included in the indicia reader 130, are triggered by the line-scan trigger D142. As shown in FIG. 9, the line-scan trigger D142, triggers the line-scan cameras to produce line-scan data which initiates activity within the item isolator 140, the dimension sensor 150, and the indicia reader 130. The activity initiated by the line-scan trigger D142 will be fully described below in the descriptions of FIG. 10, which describes the indicia reader 130, and FIG. 11, which describes the item isolator 140 and the dimension sensor 150. Similarly, the area camera trigger D151 may trigger activity in the area cameras which output area camera data to item isolator 140 and the dimension sensor 150, which is described in more detail in accordance with FIG. 11.

In an embodiment, there is one indicia reader 130 associated with each line-scan camera, which may be a virtual indicia reader. Indicia reader 130 examines the continuous strip image produced by its line-scan camera until it identifies the signature of a pre-determined indicium (typically a bar code such as a UPC) at which time it decodes the indicia image into a digital indicia value D159. Additionally, indicia reader 130 outputs the apparent location D236 of the indicia in camera-centric co-ordinates. The digital indicia data D159, item location on the transport system D148 and indicia location in camera-centric co-ordinates D236 are transferred from the indicia reader 130 to the item description compiler 200.

In some embodiments, indicia reader 130 may, on occasion, receive image retrieval requests D149 from the item description compiler 200, whereby indicia reader 130 extracts an image subframe D234 containing the indicia from the continuous strip image. The extracted images of the identified indicia are transferred to a history database 350. The history database 350 is an optional element of the system that may be used for post-analysis, and image retrieval is similarly optional.

Note that each of the line-scan cameras may detect indicia at different times, even for a single item. For example, items lying on the sensing volume conveyor belt with an indicium pointing up are likely to have at least two line-scan cameras record the image of the indicium (for example, the left-side and right-side downward looking line-scan cameras), possibly at different times. These two images of the UPC will be processed as each datum arrives at its respective indicia reader, with the two UPC values and associated camera-centric co-ordinates being sent to the item description compiler 200 asynchronously.

Returning to FIG. 9, item isolator 140 receives the line-scan camera trigger D142 and the transport system location D148 from the transport system location sensor 120. Item isolator 140 outputs a unique item index (UII) value D231 with the associated item's transport system location D148 to the item description compiler 200 only when it has isolated an item. The UII value is provided internally to the dimension estimator 154 (shown in FIGS. 8 & 11) and externally to the item description compiler 200 as soon as they are available.

Although a separate logical function in the system, the item isolator 140 computer processing in embodiments of the system may work in conjunction with the dimension sensor 150 and/or the light curtain assembly. Essentially, the item isolator A) assists the dimension estimator 154 (shown in FIGS. 8 & 11) processing to recognize the difference between one large item and more than one item positioned close together in the sensing volume, and B) instructs the dimension estimator 154 to estimate the dimensions of the one or more than one item respectively.

The dimension sensor 150 receives the area camera trigger D151, and the transport system location D148 from the transport system location sensor 120. The area camera, which is part of the dimension sensor 150, upon receipt of the area camera trigger D151, generates area camera image data and provides the area camera image data to the dimension estimator 154. In addition, working in conjunction with item isolator 140, the dimension sensor 150 collects information about the number of items in the area camera's field of view and where the items are. The dimension sensor 150, specifically the dimension estimator, combines multiple frames from area camera 152 to estimate the locus of points that form the surfaces of each item using a triangulation process. The dimension sensor 150, including the processing of the dimension estimator is described in greater detail in accordance with FIG. 11.

The dimension sensor 150 further transforms the estimated item surfaces to determine a bounding box for each individual item. That is, it calculates a smallest rectangular volume that would hold each item. In an embodiment, the length, height, and width of this bounding box are considered to be the dimensions of the item, ignoring any non-rectangular aspects of its shape. Similarly, a more complex bounding box may be calculated, treating respective portions of the item as bound by respective bounding boxes. In this approach, each object is rendered as an aggregation of parameters representing box structures, but the overall shape of the item is somewhat preserved. Collateral parameters, such as the item's orientation and 3-dimensional co-ordinates on the sensing volume conveyor belt, are also calculated in one embodiment. Further, the dimension sensor 150 can, at the discretion of the user, estimate parameter values regarding the general shape of the item (cylindrical, rectangular solid, necked bottle shape, etc.) by calculating higher order image moments. These parameter values, along with the transport system location of the item to which they apply, are the dimensioning data D166 transmitted to item description compiler 200. As an optional step, the dimension sensor 150 outputs some intermediate data, such as closed height profiles D247, to history database 350.

In an embodiment, a disambiguation functionality may be included that provides additional approaches to handling closely spaced items that are identified by the system as a single object. In this regard, for each object profiled by the dimension sensor, in addition to providing a master profile for each item, multiple subordinate height profiles may be generated. The subordinate profiles can be generated, for example, by running a blob detection operation over the master profile to determine whether subordinate regions exist. Where subordinate profiles are detected, both the master and subordinate profiles may be published with the item description for use by other subsystems. If no subordinate profiles are detected, only the master profile is published.

For cases in which subordinate profiles are detected, and multiple indicia are read for the object having subordinate profiles, a disambiguation process based on the subordinate profiles may be run. In this process, the subordinate profiles are used along with a limited universe of potential item identifications. In particular, only those item identifications corresponding to the indicia read for the object are used. Once the universe of potential matches is limited in this way, matching can proceed in accordance with the approaches described in relation to the several embodiments described herein. If the result of this matching process yields subordinate items that are all uniquely identifiable, the subordinate items are published in place of the multi-read and the master item is discarded. If unique reads are not obtained the multiple read object may be published for further analysis by the system as is.

Weight sensor 170 is the last sensor shown in FIG. 9. As previously discussed, an embodiment of the weight sensor 170 includes the in-motion scale 172 and weight generator 174 (shown in FIG. 8), which sums the signals from the in-motion scale and applies a transformation to convert voltage to weight data. For non-singulated items, where more than one item can be in the sensing volume simultaneously (i.e., closely spaced along the sensing volume conveyor belt), weight sensor 170 has two opportunities to estimate the weight of individual items: immediately after the item enters the sensing volume, and immediately after it exits the sensing volume. The object sensors of the in-motion scale provide the weight sensor 170 with information on when items have entered or exited the in-motion scale, which is used by the weight generator to determine the weight data D191 corresponding with individual items when there are multiple items located on the sensing volume conveyor belt at the same time. When multiple items overlap as they enter or exit the sensing volume the weight sensors produces an aggregate weight for the overlapping items. The weight sensor 170 transfers weight data D191, which is the item weight and item's location on the transport system, to the item description compiler 200. Optionally, the continuous stream of weight data 191 is sent to the history database 350 in Step D190. The weight sensor 170 also delivers belt control commands D50 to the transport system motor controllers, as will be described below.

As indicated in the descriptions of FIGS. 8 and 9, in one embodiment, the item description compiler 200 receives data from all the various parameter sensors. Item description compiler 200 conducts geometric-parameter matching, which is the process of using the known geometry of the various physical sensors and their fields-of-view to match the measured parameter values with the item that was in their fields-of-view at the moment(s) the measurements were made.

An item description (the output of item description compiler 200) is compiled by matching the measured parameter value with the item known to be in the particular sensor's field-of-view. As described above, where each sensor's field of view is known, for example relative to a fixed reference point in the transport system, it is possible to associate an instance of item detection with a particular location. From time to time it may be useful to calibrate the system by imaging an item having known geometry and/or indicia, for example an open box of a known size and having indicia located at known locations thereon.

As an example, a line-scan camera looking straight down on the belt might have a field of view described as a straight line across the sensing volume conveyor belt, with the center of the line at the center of the sensing volume conveyor belt in the across motion dimension and six inches downstream from a reference point defined for the item description compiler 200.

In this example, indicia reader 130 determines that UPC 10001101110 was read starting at 200 pixels from the left end of the line scan camera's field of view, at the instant that the transport system location was 20,500 inches from its initialization point. Using known information regarding the camera parameters and the camera's geometric relationship to the sensing volume conveyor belt, item description compiler 200 can determine that the UPC was observed 1 inch from the left of the sensing volume conveyor belt and at a transport system location of 20,494 inches. The item description compiler 200 then associates this UPC with the item (with an arbitrary UII, 2541 as an example) that was observed to be closest to transport system location 20,494 inches. Similarly, when the weight sensor, specifically the weight generator, reports a weight data D191 for an item was loaded onto the in-motion scale at transport system location 20,494, item description compiler 200 associates that weight data D191 with item UII 2541.

The geo-parameter matching process is generally more complex than this simple example, and makes use of knowledge of the full three-dimensional field of sensing of each physical sensor. In one embodiment, the full three-dimensional geometry of all of the sensor's respective fields of sensing may be compiled into a library for use by the item description compiler 200. The library is used by the description compiler 200 to associate items and sensed parameters. Thus, in an embodiment, it is the full three-dimensional location of each item (for example a set of transverse, longitudinal, and rotational coordinates of the item) combined with the item's height, width, and depth that are used in the compilation of a complete item description of each item. Because no two items can exist in the same physical space, transport system location D148 and the bounding box description of each item may be used by the item description compiler 200 for matching parameter values to the correct item.

The item identification proceeds as described above in the sections labeled Geometric-Parameter Matching and Product Identification. In the example of a retail sales environment, once the product is identified, the item identification processor 300 transfers the product identification data D233 to a point of sale (POS) system 400. Alternative uses for the system are contemplated other than in forward logistics retail systems and processes. For instance, the system could be employed in reverse logistics, where product identifications are sent to an auctioneer, a distribution center, a manufacturer, or other entity.

Housekeeping Functions

In an embodiment, a configuration and monitoring process keeps track of and updates system calibration data while continually monitoring the activity of each software process. Each process can be configured to issue a regular heartbeat signal. If the heartbeat from a particular parameter processor or subsystem is not received after a period of time, the configuration and monitoring process can kill and restart that particular parameter processor. In embodiments employing an asynchronous dataflow architecture, killing and restarting any one process does not generally affect any other process or require re-synchronizing with a clock signal. However, some items passing through the system during the re-boot might not be identified, in which case they may be handled by the normal exception procedures.

File Transfer Process

The file transfer process is responsible for moving lower-priority, generally large, data files across the network from the various parameter sensors to the history database 350, when this optional database is included. The file transfer process manages the transfer of large files including, but not limited to, the line-scan images produced as part of the indicia reader processing, the height profiles generated by the dimension estimator, and weight transducer data streams. If file transfers took place indiscriminately, high-priority, real-time data transfers such as line-scan data streaming could be interrupted by lower-priority data transfers. The file transfer process manages those potential conflicts.

In an embodiment, each real-time file transfer process, which is used for large, low-priority (LLP) data sets/files, first stores the LLP data locally on the hard drive of the parameter processor where the data sets are created. On a regular basis, approximately every three hundred milliseconds, the file transfer process running on the one or more computers hosting that parameter processor checks for newly-deposited LLP data and sends the data over the network to the history database, which may be associated with the item identification processor for convenience. Data is transmitted in a metered fashion, with limited packet sizes and enforced packet-to-packet transmission delays, so average network bandwidth is minimally reduced.

The configuration parameters for the file transfer process reside in a configuration database. Configuration information such as packet sizes, transmission delays, and IP and destination server addresses are saved in the database. The file transfer process uses standard file transfer protocol, and is implemented in an embodiment using the cURL open-source library.

Indicia Reader 130

Figure 10:
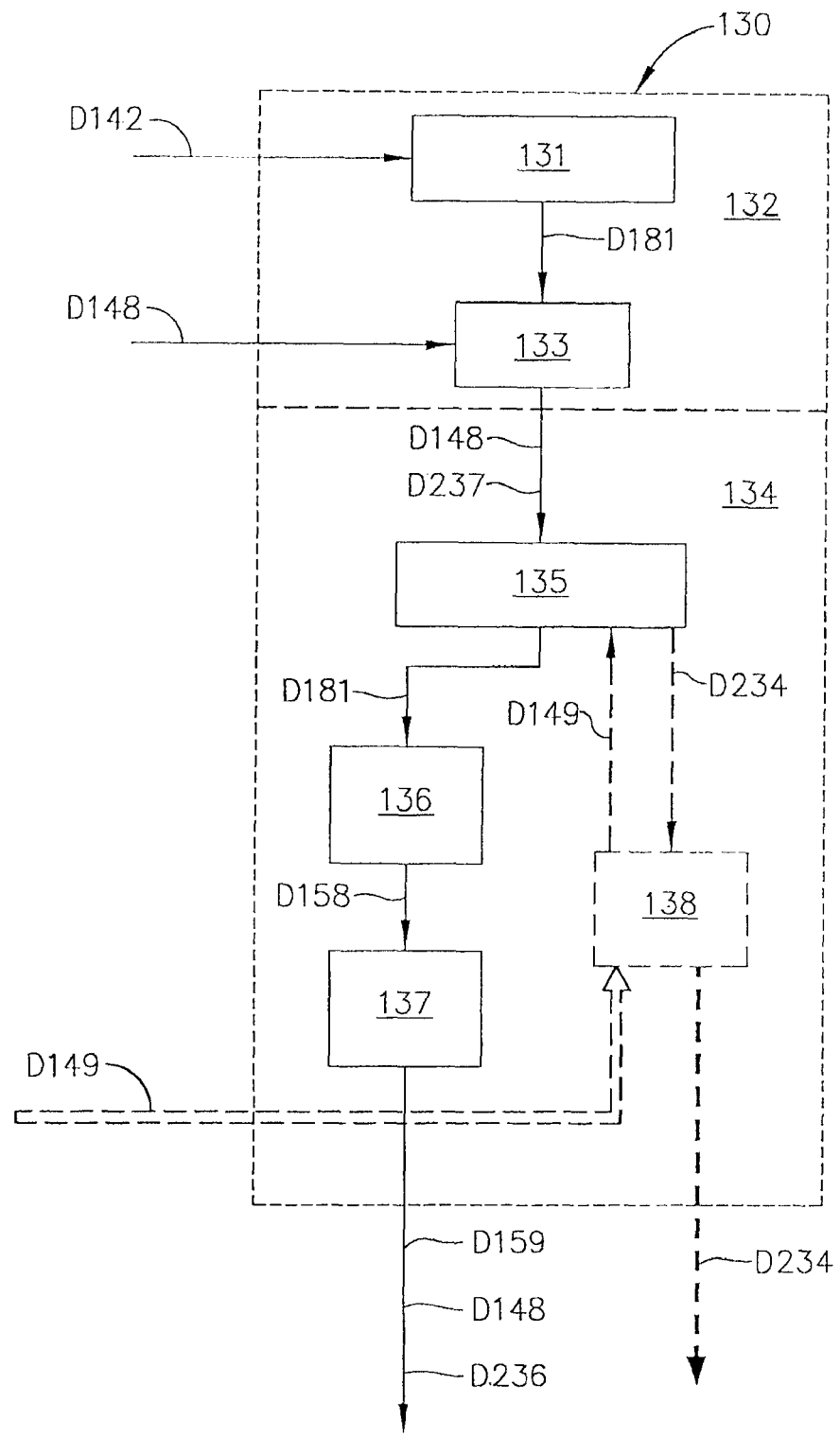

FIG. 10 is an information flow diagram for an embodiment of the indicia reader. In an embodiment of the system 25, there are eleven line-scan cameras, and as previously noted, there is one (virtual) indicia reader 130 logically associated with each line-scan camera, even though all of the indicia reader processing in practice may occur on the same physical processor. The indicia reader 130 performs three functions: identifying and decoding any captured indicia and, optionally, extracting indicia images from the continuous strip image collected by the line-scan camera 132. Thus, each indicia reader 130 in the embodiment effectively operates as a bar code decoder. In the embodiment, the eleven indicia sensors together define a four pi steradian indicia reading system. Each indicia reader 130 comprises a parameter processor programmed to identify indicia in the line-scan data captured by each of the line-scan cameras 132 and to interpret the indicia into digital indicia data. As previously described, each line-scan camera 132 receives a line-scan trigger D142 based on the motion of the transport system.

A line-scan datum is the output from a single field of a line-scan camera array 131. Each line-scan datum D181 collected by the line-scan camera array 131 is transferred to a line-scan camera buffer 133, which is internal to line-scan camera 132. The line-scan camera buffer 133 compiles the line-scan data D181 together into packages of two hundred line-scan data, which may be referred to as image swaths D237.

In an embodiment, the nominal imaging resolution at the item for each 4,096 pixel line-scan camera 132 is approximately two hundred dpi. Thus, an image swath of two hundred line-scan data corresponds to an approximately one inch by twenty inch field-of-view. Each line-scan camera may be configured to transfer individual image swaths from the camera to a circular acquisition buffer 135 in the indicia parameter processor 134. It should be noted that image swaths D237 are used to transfer data between the line-scan camera 132 and the indicia parameter processor 134 for communication efficiency only; the data processing in indicia parameter processor 134 is performed on a line-by-line basis. Further, it should be noted that line-scan camera buffer 133 collects and saves line-scan data every time the transport system has moved by the defined trigger increment, independent of the presence of an the item in the sensing volume.

As discussed above, each image swath D237 is tagged with a relevant transport system location D148 value, where, generally, one location value is all that is needed for each 200 line swath. Image swaths D237 are concatenated in the circular acquisition buffer 135 to re-form their original, continuous strip image format. Consequently, even if an item or an indicium on an item spans multiple image swaths D237, the item or the indicium can be processed in its entirety after additional image swaths D237 are received by the circular acquisition buffer 135. In an embodiment, the circular acquisition buffer 135 is configured to hold 20,000 lines of camera data.

Indicia reader 130 extracts data from buffer 135 and examines line-scan data D181 line by line, in a signature analysis process 136, in both the "cross-track" (within each line) and the "along track" (one line to the next) directions, to find the signature characteristics of a predetermined indicia format. For example, UPC bar codes can be recognized by their high-low-high intensity transitions. During signature analysis 136, identified indicia are extracted from the line-scan data and the extracted indicia D158 transferred to a decoding logic process 137. Decoding logic process 137 converts image data into a machine-readable digital indicia value D159. OMNIPLANAR® software (trademark registered to Metrologic Instruments, Inc.; acquired by Honeywell in 2008) is an example of software suitable to perform the indicia identification and decoding in the indicia reader. As will be appreciated, multiple parallel or serial logic processes may be employed to allow for redundant identification. In this regard, where a first approach to identification and decoding of a code is unsuccessful, a second approach may prove fruitful.

In an embodiment, items are generally marked with indicia wherein the indicia conform to various pre-determined standards. Examples of indicia capable of being read by the decoding logic process 137 include but, are not limited to, the following: EAN-8, EAN-13, UPC-A and UPC-E one-dimensional bar codes that capture 8-, 12- and 13-digit Global Trade Item Numbers (GTIN).

It will be understood that the indicia reader 130 may operate continuously on the line-scan data. In the context of a bar code reader, when a high-low pattern is observed in the line scan the software attempts to identify it as an indicium. If it is identified as such, the software then decodes the full indicium into a digital indicia value. In particular embodiments, the line-scan data presented to the decoding logic process 137 is monochromatic, so the decoding logic process 137 relies on lighting and other aspects of the optical configuration in the line-scan data to present information with sufficient contrast and resolution to enable decoding indicia printed according to UPC/EAN standards.

The output from decoding logic process 137 contains three data: the digital indicia value D159, the transport system location D148 corresponding to the one or more line-scan data in which the indicia was identified, and the indicia location in camera-centric coordinates D236. In this regard, the camera-centric coordinates could describe a two dimensional area occupied by the entire indicium. Alternately, a particular X-Y location, for example a centroid of the indicium image, a particular corner, or an edge, could be assigned to that indicium.

Besides identifying and decoding indicia, a second, optional, function of the indicia reader 130 is to extract images of individual items as requested by the item description compiler 200, and to transfer these images, the extracted image subframes D234, to the history database 350. The item description compiler 200 issues an image retrieval request D234, along with the transport system location describing where the item bearing the indicia was located in the field of view of the line-scan camera 132, causing a region extract process 138 to send out the image retrieval request D149 to retrieve the appropriate subframe D234 from the circular acquisition buffer 135. Region extract process 138 then performs JPEG compression of the extracted subframe D234, and transmits it via the file transfer process to history database 350.

Item Isolator 140 and Dimension Sensor 150

Figure 11:
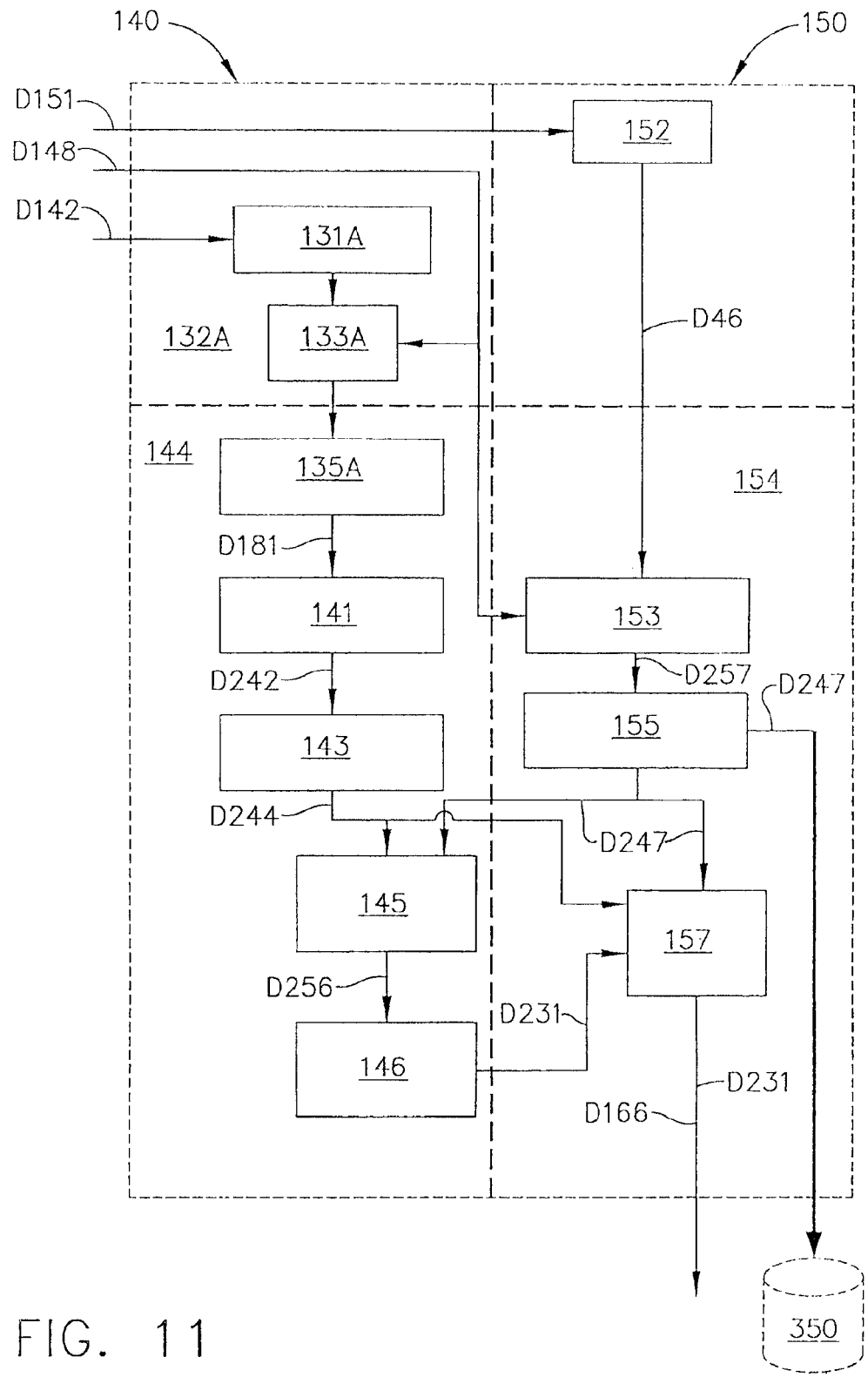

Turning to FIG. 11, an information flow diagram of an embodiment of the dimension sensor 150 and the item isolator 140 is provided. The dimension sensor 150 functions primarily for item dimensioning, or measuring the spatial extent of individual items, while the item isolator 140 functions primarily for item isolation, or sorting out or distinguishing the items entering the sensing volume. For example, if two boxes enter the sensing volume in close proximity, the item isolator 140 informs the rest of the system that there are two items to identify, and the dimension sensor 150 informs the system of the size, orientation, and location of each of the two items. As has been mentioned, these two processes operate in close co-ordination although they are performing distinctly different functions. Since the dimensioning process actually starts prior to the item being fully identified by the item isolator 140, the dimension sensor 150 will be addressed before the item isolator 140. In an embodiment, both the dimension sensor 150 and the item isolator 140 utilize the output of one of the line-scan cameras 132A and the area camera 152.

Dimension Sensor 150

In an embodiment, dimension sensor 150 includes the area camera 152 and upward-looking line-scan camera 132A. The dimension estimator 154 (the parameter processor portion of dimension sensor 150) receives data from area camera 152, upward-looking line-scan camera 132A, and transport system location sensor 120 (shown in FIG. 8).

The main function of dimension sensor 150 is item dimensioning. During the height profile cross-section extraction process 153 and the aggregation process 155, the dimension sensor 150 combines multiple frames from area camera 152 to estimate the locus of points that form the surfaces of each item using a triangulation process. As implemented in one embodiment, a laser line generator continuously projects a line of light onto sensing volume conveyor belt (and any item thereon). The line is projected from above and runs substantially perpendicular to the belt's along-track direction. In operation, the line of light will run up and over any item on the belt that passes through its field of view. Triggered by the area camera trigger D151, area camera 152 records an image of the line of light. There is a known, fixed angle between the laser line generator projection axis and the area camera's optical axis so the image of the line of light in area camera 152 will be displaced perpendicular to the length of the line by an amount proportional to the height of the laser line above the reference surface, which may conveniently be defined as the upper surface of the conveyor belt. That is, each frame from area camera 152 is a line of light, apparently running from one edge of the belt to the other, with wiggles or sideways steps, the wiggles and steps indicative of a single height profile of the items on the belt.

Triggered by the area camera trigger D151, the area camera 152 provides an area camera image datum (a single image) every time the transport sensing volume conveyor belt moves by the selected count interval. In some embodiments the contrast of this height profile may be enhanced through the use of an infrared laser and a band pass filter selected to preferentially pass infrared light positioned in front of area camera 152. With the filter in place, the output of the area camera 152 is area camera image data D46, which contains a two-dimensional image showing only the displacement of the laser stripe as it passes over the item.

The area camera 152 takes snapshots of the laser stripe that is projected across the sensing volume conveyor belt (edge to edge) by the laser stripe generator. The area camera image data D46 and the transport system location D148 value when the area camera image data D46 was recorded, are distributed to item isolating parameter processor 144 and dimension estimator 154, which operate in close coordination.

A height profile cross-section extraction process 153 extracts a height profile cross-section D257 from the area camera image data D46 by determining the lateral displacement of the laser stripe, which was projected by the laser line generator over the item. When there is an angle between the laser stripe projection direction and the viewing angle of area camera 152, the image of the stripe is displaced laterally whenever the stripe is intercepted by a non-zero height item. The dimension estimator 154 uses a triangulation algorithm to calculate height profile cross-section D257 of the item along the original (undisplaced) path of that linear stripe. Note that the height profile cross-section D257 is a height map of everything on the belt at the locations under the laser stripe.

Height profile cross-section D257 is represented by a collection of height data points, which are herein referred to as hixels. Each hixel represents the height (z) of a point in an (x,y) position grid. As shown in FIG. 3A, the y-coordinate represents the cross-belt position, the x-coordinate represents the along-belt position, and the z-coordinate represents height. Height profile cross-section extraction process 153 is applied to each frame of area camera 152, the camera being triggered each time the transport system moves by a predetermined distance, about 0.005 inches in one embodiment.

The resulting sequence of height profile cross-sections are combined into groups by an aggregation process 155 to build closed height profiles D247. The aggregation process 155 is based on a pre-defined minimum association distance. If the distance between any two hixels is less than this association distance, they are considered to belong to the same group. A closed height profile D247 is created once there are no more hixels arriving from height profile cross-section extraction process 153 that can plausibly be associated with the group. In other words, a closed height profile D247 comprises all of the non-zero height points on the belt that could plausibly be part of a single item. It should be noted that a closed height profile D247 may actually comprise two or more close together items.

Each closed height profile D247 is compared to pre-determined minimum length and width dimensions to ensure that it represents a real item and a not just a few, noise-generated hixels. When available, closed height profiles D247 are sent to the dimension parameter estimation process 157 and the dimension merging process 145. Closed height profiles D247 are optionally sent to history database 350.

In an embodiment, the height profile may be smoothed to account for sensor noise. In this approach, once a height profile is assembled for a single object, portions of the profile that appear to be outliers may be removed. As will be appreciated, removal of apparent outliers prior to profile assembly could eliminate portions of an actual object that are separated by a discontinuity, for example a mug handle may appear as an object separate from the mug body in a particular viewing plane. However, once the profile is assembled, this type of discontinuity would tend to be resolved, allowing for smoothing to be performed without destroying information about discontinuous object regions.

It may also be useful to include a zeroing or belt-floor determination function for the height profiling system. During ordinary use, the belt will continuously pass through the laser stripe projection, and the system should measure a zero object height. In theory, the belt floor may be measured using a running average height measurement, and that measurement may be used as a dynamic threshold that is subtracted from or added to the measured height of objects passing along the conveyor. In practice, it may be difficult to distinguish an empty belt from a belt carrying short items, which could throw off the zero measurement if treated as an empty belt. One solution is to use a predetermined height threshold and for the system to treat anything less than the threshold height is an empty belt. Even if a real object passes through the system, its effects will be smoothed as a result of the running averaging. This may allow for removal of slow-varying portions of the signal while allowing for removal of high frequency information.

The second data source for dimension sensor 150 is a selected line-scan camera 132A (where the suffix "A" indicates the selected camera), wherein the selected camera is, in this example, specifically the upward-looking line-scan camera array 131A. Camera 132A produces line-scan data after receiving line-scan trigger signals D142. The line-scan data is then sent to a line-scan camera buffer 133A, as described above for indicia reader 130.

As has already been mentioned, many of the same data processing functions are used for dimensioning and item isolation. Thus, the line-scan camera buffer 133A outputs image swaths to the circular acquisition buffer 135A, which is illustrated in FIG. 11 as being disposed in item isolator parameter processor 144. Also, as one of skill in the art will recognize, the various data processing steps illustrated herein are grouped as belonging to a particular processor (e.g., item isolating parameter processor, dimension estimator, etc.) for convenience of explication only and such grouping is not intended to indicate in which physical processing unit such processing steps occur.

The upward looking line-scan camera is disposed to observe the bottom of items on the sensing volume conveyor belt. This camera is aligned to image through the small gap between the in-feed conveyor belt and the sensing volume conveyor belt. Unlike the other line-scan cameras, the upward looking line-scan camera does not need a large depth-of-focus because it is generally observing a consistent plane. That is, the bottom of every item tends to be approximately in the plane of the sensing volume conveyor belt. In general, each line scan comprises some dark pixels (where no item is over the gap) and some illuminated pixels (where part of an item is over the gap). The silhouette generator 141, in the item isolator parameter processor 144 processes the line-scan data D181 received from the circular acquisition buffer 135A line-by-line and determines if the intensity of any of the pixels exceed a predetermined threshold. Pixels that exceed the threshold are set to the binary level of high while those below the threshold are set to binary low, viz., 0. Any line containing at least one high value is called a silhouette D242. (A line without one high value is a null silhouette.) It will be understood that any silhouette may contain information about multiple items. The silhouette D242 produced by silhouette generator 141 is sent to an outline generator 143, which is the logical process for building bottom outlines.

In conjunction with the upward looking line-scan camera, the light curtain assembly also observes the gap 36 and objects passing over it. As described above, pair-wise scans of the LEDs and photodiodes detect shadowed portions of the scanned line. Because the light curtain is a bright field detector, its silhouettes correspond not to bright pixels, as in the upward looking line-scan camera, but rather to dark pixels. For many objects, both detectors will mark the same silhouette positions. However for certain objects, one of the two detectors may fail to observe the item. For example, the light curtain may fail when a transparent object passes through its field of view, while the camera may fail when confronted with an object that is a poor reflector. In one embodiment, the two silhouettes can be subjected to a Boolean OR operation so that if either or both detectors identify an object, the object is noted by the system. Alternately, the two systems can operate independently, and each produce its own set of parameters for evaluation by the system.

The sequence of silhouettes are combined into clusters by an aggregation process similar to the generation of groups that takes place in outline generator 143. The outline generator 143 is based on a defined minimum association distance. If the distance between any two high pixels in the sequence of silhouettes is less than this association distance, they are considered to belong to the same cluster. Thus, a cluster includes both pixels along a scan line and pixels in adjacent scan lines. The bottom outline D244 of each such pixel cluster is computed by taking slices along the x- (along-belt) and y- (cross-belt) directions, and by finding the first and last transitions between cluster pixels and background for each row and column. That is, if there are gaps between cluster pixels along a row or column the processor skips these transitions because there are more pixels in the same cluster further along the row or column. This bottom outline definition assumes that items are generally convex. When this approach to extracting outlines is used, holes inside items will be ignored. The bottom outline D244 is used during the dimension merging process 145. For a system incorporating both a light curtain and a line scan camera, there may be two bottom outlines D244, or alternately, the two acquired data sets can be used in tandem to define a single bottom outline D244. For the purposes of the following discussion and associated Figures, either outline separately or both together are referred to as D244, and the singular should be understood as comprehending the plural.

The bottom outline D244 is used in some embodiments to refine the dimension understanding of each item. For example, as described above, the laser stripe viewed by area camera 152 is at an angle to the sensing volume. Because of the angle, tall items may shadow adjacent short items. Information from the upward looking line-scan camera may allow the dimensioner and item isolator to more reliably detect those shadowed items and report their bottom outlines in the x and y dimensions.

Before calculating length, width, and height of the smallest bounding box enclosing an item during the dimension parameter estimation process 157, the closed height profile D247 may be mathematically rotated (in the plane of the conveyor belt) to a standard orientation during the dimension merging process 145. In some embodiments, the closed height profile D247 is projected on the x-y plane (i.e., the conveyor belt plane) to correlate with the set of transverse, longitudinal, and rotational co-ordinates of the bottom outline D244. The first and second moments of these points are calculated, from which the orientation of the major and minor axes are derived. The closed height profile D247 may then be mathematically rotated such that those axes are aligned with respect to the rows and columns of a temporary image buffer, thereby simplifying calculations of the item's length and width.

The item's length may be defined as the largest of the two dimensions in the x-y plane while the width is defined as the smaller. The item's height is also calculated by histogramming all the item's height data from the closed height profile and finding the value near the peak (e.g., the 95th percentile).

For subsequent validation of the item during the dimension merging process 145, additional moments can be computed describing the item's height. After rotating the closed height profile D247, the three-dimensional second moments are calculated. In calculating these moments, the item is considered to be of uniform density, filled from the top of the measured height to the belt surface. The dimension system generates parameters including, but not limited to, second moments, which are distinct from those used to determine the item's orientation, and the width, length, and height, which are stored in a history database. These parameters, along with the weight information from the weight sensor and the indicia from the indicia reader, are used for validating the item.

Once a bottom outline D244 is complete (in the sense that no more pixels will be associated with this group of pixels), feature extraction is performed to determine the item's orientation, length, and width. In some embodiments, pixels along the outline (perimeter) of a cluster on the x-y plane (i.e., the sensing volume conveyor belt plane) are analyzed. Pixels within the outline are treated as filled, even if there are holes within the interior of the actual item. The first and second moments of these points are calculated, and the orientations of the major and minor axes are derived. The bottom outline D244 is then mathematically rotated such that those axes are aligned with respect to the rows and columns of a temporary image buffer, simplifying calculations of the bottom outline's length and width. The bottom outline's length, width, orientation, and second moment, collectively known herein as merged data D256, are sent to the item isolation process 146 and the dimension parameter estimation process 157.

The bottom outlines D244 and the closed height profiles D247 are also used in the dimension parameter estimation process 157. The dimension parameter estimation process 157 also receives the UII value D231 along with the corresponding transport system location D148 regarding an item.

In the dimension parameter estimation process 157, the dimension estimator 154 receives the bottom outline D244, the UII value D231 with the transport system location D148, and the closed height profile D247 to determine a bounding box for each individual item. In some embodiments, because noise from even a single stray pixel could adversely change the measurement, an item's length, width, and height are not based on the maximum extent of the aggregated pixels. Instead, the dimension merging process 145 computes a histogram that bears a number of pixels in each of the three dimensions, after the item has been rotated to the standard orientation. The distances are computed between about the one-percentile and about ninety-nine-percentile boundaries to give the length, width, and height of the item.

If an item does not produce a bottom outline, the only dimensioning data produced by the item is a closed height profile. This can occur, for example, if the bottom of the item is very dark, as perhaps with a jar of grape jelly, though the supplemental use of the light curtain will tend to address this issue. Feature extraction and item isolation are performed solely on the closed height profile when the closed height profile D247 is the only dimensioning data produced. If light curtain data and closed height profile are available and camera data is not, then those two may be used.

If a group has one or more bottom outlines D244 and one or more closed height profiles D247, there are several choices for extracting features. In an embodiment, the system may ignore the bottom outlines and only operate on the basis of the closed height profiles. In other words, in this approach, bottom outlines are only used to assist in the interpretation of dimensioning data collected from closed height profiles. Feature extraction based on multiple closed height profiles is performed just as it is for a single closed height profile, but using data from the group of closed height profiles.

Finally, if the dimension parameter estimation process 157 has not received a closed height profile D247 corresponding with transport system location value D148, the dimension parameter estimation process 157 will have only the bottom outline D244 to determine the dimensioning data D166 for the item. For example, a greeting card has a height too short to be detected by the dimension sensor 150. Therefore, the height of the item is set to zero, and the item's length and width are determined solely from the bottom outline. The length and width are calculated by rotating and processing the bottom outline's x,y data as described above for the dimension estimator 154 using first and second moments. When no closed height profile is available, a three-dimensional second moment is not calculated.

Periodically, the dimension parameter estimation process 157 checks the transport system location D148, and sends collected dimensioning data D166 to the item description compiler 200 when it determines that there are no further closed height profiles D247 or bottom outlines D244 to be associated with a particular item. The dimension estimator 154 also uses the data to estimate various dimensioning data D166 including, but not limited to, parameter values regarding the general shape of the item (cylindrical, rectangular solid, necked bottle shape, etc.), the item's orientation on the transport system, and details concerning the item's three-dimensional co-ordinates on the sensing volume conveyor belt. In this embodiment the dimension sensor 150 is also capable of calculating other parameter values based on the size and shape of the item. The various dimensioning data D166 along with the transport system location D148 values of the items, are sent to the item description compiler 200 as they are calculated.

Item Isolator 140

FIG. 11 also shows the Item Isolator 140, which may allow the system to operate on non-singulated items. In operation, the item isolator 140 recognizes that something (one or more items) has entered the sensing volume. During the dimension merging process 145, when the closed height profiles D247 and bottom outlines D244 overlap spatially (i.e., they are at least partially merged) they may be associated with a single item, and the item isolator 140 may be said to have isolated an item passing through the sensing volume. In the item isolation process 146, the item isolator 140 merges the closed height profile D247 with the bottom outline D244, generating merged data D256. Due to the way bottom outline D244 and closed height profile D247 descriptions are created, all bottom outlines D244 are mutually disjointed spatially, and all closed height profiles D247 are mutually disjointed spatially. The dimension merging process 145 waits for an event. The dimension merging process 145 stores and keeps tracks of closed height profiles D247 and bottom outlines D244 as they are received. When a new closed height profile D247 is received, the dimension merging process 145 checks it against the collection of bottom outlines D244 to see if the closed height profile D247 and a particular bottom outline D244 overlap spatially. Closed height profiles D247 and bottom outlines D244 that overlap spatially are placed into one group. The dimension merging process 145 does not check the closed height profile D247 against other closed height profiles because they are, by definition, disjoint. Similarly, after a new bottom outline D244 is received, it is checked against the collection of the closed height profiles D247 received to see if the bottom outline D244 overlaps any closed height profile D247.

During the dimension merging process 145, the item isolator 140 matches the transport system location D148 values of the bottom outline D244 with any closed height profile D247 that shares substantially the same transport system location D148 values. At this point, the item isolator 140 recognizes the bottom silhouette of the item and recognizes the height of substantially every point of the item, and is ready to deliver the merged data D256 to the item isolation process 146.

Second, the item isolator 140 determines how many distinct items comprise the object that entered the sensing volume. In certain cases, several individual items are mistaken as a single item in one or the other data sets. The purpose of the item isolation process 146 is to determine when closed height profile D247 and bottom outlines D244 represent the same single item and when they represent multiple items.

Third, the item isolator 140, specifically the item indexer, assigns a Unique Item Index value (UII) D231 to each distinct item, and, fourth, along with the UII D231, the item isolator 140 identifies the two-dimensional location of the item (the transport system location D148 value). With knowledge of the merged data D256, likely belonging to a single item, the item isolator 140 assigns a UII value D231 to the merged data D256 with known transport system location D148 values. The item isolation process 146 results in the UII value D231 along with the transport system location D148 being communicated to the dimension parameter estimation process 157 for further processing by the dimension estimator. The dimension parameter estimation process 157 receives the UII value D231, the merged data D256 with known transport system location D148 values, and outputs the dimensioning data D166 with the UII value D231 (and the transport system location) to other parts of the system (particularly the item description compiler 200 as shown in FIGS. 8 & 9).

Item isolation process 146 improves the reliability of system output. In an embodiment, a failure of the item isolator 140 stops all system operations, because the system cannot ascertain the number of items in the sensing volume or the location of those items, and, therefore, does not know what to do with the data from the parameter sensors. However, failure of only a portion of the item isolation system need not stop the system. The item isolation process 146 allows the item isolator 140 to continue to function if the upward looking line-scan camera stops functioning, using light curtain data and/or closed height profiles D247 for each item.

Conversely, if the dimension estimator 154 fails and the upward looking line-scan camera outline detection and/or the light curtain continues to function, bottom outlines D244 but no closed height profiles D247 will be reported. The system may continue to operate in a degraded mode since the heights of items are not available for item identification. However, determination of item weight, length, and width is still possible, and items will not generally go through the sensing volume undetected, even if a number of exceptions is increased.

Weight Sensor 170

Referring now to FIG. 12, a schematic illustration of weight sensor 170 is shown. Weight sensor 170 includes an in-motion scale 172 and a weight generator 174. In-motion scale 172 includes object sensors (in-feed conveyor belt object sensor 173A, sensing volume entrance object sensor 173B, and sensing volume exit object sensor 173C are shown) and load cells 175A, 175B, 175C, and 175D.

Object sensors, such as in-feed conveyor belt object sensor 173A, sensing volume entrance object sensor 173B, and sensing volume exit object sensor 173C, allow the weight generator to track which items are on the in-motion scale 172 at a given time. Sensing volume entrance object sensor 173B is positioned near the in-feed end of the sensing volume. Sensing volume exit object sensor 173C, positioned near the out-feed end of the sensing volume, along with sensing volume entrance object sensor 173B provides loading information to enable the system to accurately calculate the weight of multiple items in the sensing volume at a given time. In-feed conveyor belt object sensor 173A is positioned several inches upstream from the in-feed end of the sensing volume conveyor belt and enables an optional operating mode in which the in-feed conveyor belt can be stopped.

To put it another way, the inclusion of object sensors enables the system to estimate the weight of most of the individual items by combining the instantaneous total weight on the sensing volume conveyor belt (not shown in FIG. 12) with the item's transport system location D148 values. However, in some embodiments, accurate weight data D191 cannot be measured by the weight generator 174 when items enter the sensing volume while other items are exiting. Therefore, in these embodiments, object sensors may be employed to prevent simultaneous loading and unloading of items from in-motion scale 172. In other words, object position logic 176, upon receiving transport system location D148 and data from in-feed conveyor belt object sensor 173A, sensing volume entrance object sensor 173B, and sensing volume exit object sensor 173C, can determine that an item will be entering the sensing volume at the same time that an item will be exiting the sensing volume and can signal the transport system to hold back from passing any new items to the sensing volume if there is an item about to depart from the sensing volume. In other embodiments the object position logic can also stop the sensing volume conveyor belt if, for example, the scale has not had time to settle after loading a new item. The object position logic 176 transmits start and stop signals D115 to the average and differencing process 178 where the logic calculates the average of and the changes in initial sensing data received from load cells 175 to ensure that calculations are performed at the proper time.

It will be noted that stopping and starting the conveyor belts to hold back items from loading into/unloading from the sensing volume has no negative effects on the measurements made by the system; from the perspective of the sensing volume stopping the in-feed conveyor belt only spreads out items on the sensing volume conveyor belt while stopping the sensing volume conveyor belt puts all of the digital processing steps into a suspended mode that may be restarted when the belt is restarted.

As shown in FIG. 12, object position logic 176 additionally uses the information received from the object sensors along with the transport system location D148 to issue belt control commands D50. These commands are sent to the transport system location sensor 120 (FIG. 9) wherein, in one embodiment, the motor controllers reside. For example, using the information received from sensing volume object sensor 173C, object position logic 176 can determine that an item is about to exit the sensing volume. In order to prevent an item from entering the sensing volume at the same time, object position logic 176 can send a belt control command D50 to stop the in-feed conveyor belt from continuing to transport items toward the sensing volume. Additionally, or alternatively, belt control commands D50 can include increasing or decreasing the speed of the conveyor belts in order to limit the number of items that an operator of the system 25 can physically place on the in-feed conveyor belt. Similarly, in some embodiments, the in-motion scale 172 may require periodic self-calibration time during which no items are permitted on the scan tunnel conveyor belt, allowing it to return to its tare weight in order to maintain accuracy. This calibration condition is achieved by stopping the in-feed conveyor belt. Other belt control commands D50 can be transmitted by object position logic 176, depending on the specific application contemplated.

Load cells 175A, 175B, 175C, and 175D are disposed in the load path and typically support the sensing volume conveyor belt (not shown in FIG. 12, but shown in at least FIG. 2B). Each load cell generates an electrical signal proportional to the compression force applied to the load cell. In some embodiments, load cells 175A, 175B, 175C, and 175D are digitized with a high sample rate (e.g., 4000 samples per second) before being transmitted for processing by weight generator 174.

The high sample rate load cell samples are received by the summation process 177, wherein the signals from the load cells are summed and scaled to represent the total weight data of the in-motion scale 172 and any items on the in-motion scale 172. The total weight data D190 from the summation process 177 is optionally sent to the history database in step D190. Additionally, this sum is low-pass filtered (or averaged) to improve the signal-to-noise ratio and give a more accurate total weight in the average-and-differencing process 178. The number of digital samples included in the average calculated during the average-and-differencing process 178 is limited by the number of samples taken while the weight on the in-motion scale 172 is stable. For example, if only one item were loaded onto the sensing volume conveyor belt, the stable period extends from the moment the one item is fully on the sensing volume conveyor belt until the moment the item begins to move off of the sensing volume conveyor belt. When more than one item is on the sensing volume conveyor belt at a given time the stable periods are limited to the times when no item is being loaded onto or moving off of the sensing volume conveyor belt. In a noise-free environment, the weight generator could identify stable periods by the data alone. However, the weight generator typically operates in the presence of some, if not a significant amount of noise. Object sensors 173A, 173B, and 173C, therefore, inform the weight generator (via object position logic 176) when items are loading or unloading from the sensing volume conveyor belt for appropriate averaging. It should be noted that although the language herein suggests temporal considerations, in an embodiment the system process does not include a clock signal, but rather is only clocked by incremental movements of the scan tunnel conveyor belt. Thus, a stable period can be extended by stopping the scan tunnel conveyor belt and the actual number of samples in the average will continue to increase at the data sample rate (4000 samples per second in one embodiment).

Additionally, average-and-differencing process 178, as commanded by the start and stop signals D115, performs a differencing operation between weight values obtained before an item is loaded onto/unloaded from scale 172 and after an item is loaded onto/unloaded from scale 172. The weight values thusly obtained are assigned to the item or items loaded onto/unloaded from scale 172 during the instant transition. There are several alternative approaches to performing the differencing function that may be used to achieve essentially the same weight data D191. The selection among these alternatives is generally determined by the available hardware and digital processing resources and by operating conditions (e.g., load cell signal-to-noise ratio, load cell drift, etc.). One particular approach is discussed below in conjunction with FIG. 13.

Returning to FIG. 12, weight values D191A are transferred from average-and-differencing process 178 to an assign-weight process 179, wherein weight values D191A are combined with object position data D113, which is data that was generated by object position logic 176. It should be noted that object position logic 176 cannot identify individual items in an overlap condition. Object positions D113 are determined by combining the off and on signals from the object sensors with the transport system locations D148. The combination of item weights and object positions are the item weight data D191. For non-overlapped items the item weight data is the weight of the item; for overlapped items the item weight data is the combined weight of the more than one item. Item weight data D191 is passed on to the item description compiler 200. Optionally, the continuous stream of total weight data D190 is sent to the history database 350 (as shown in FIG. 8).

Figure 13:
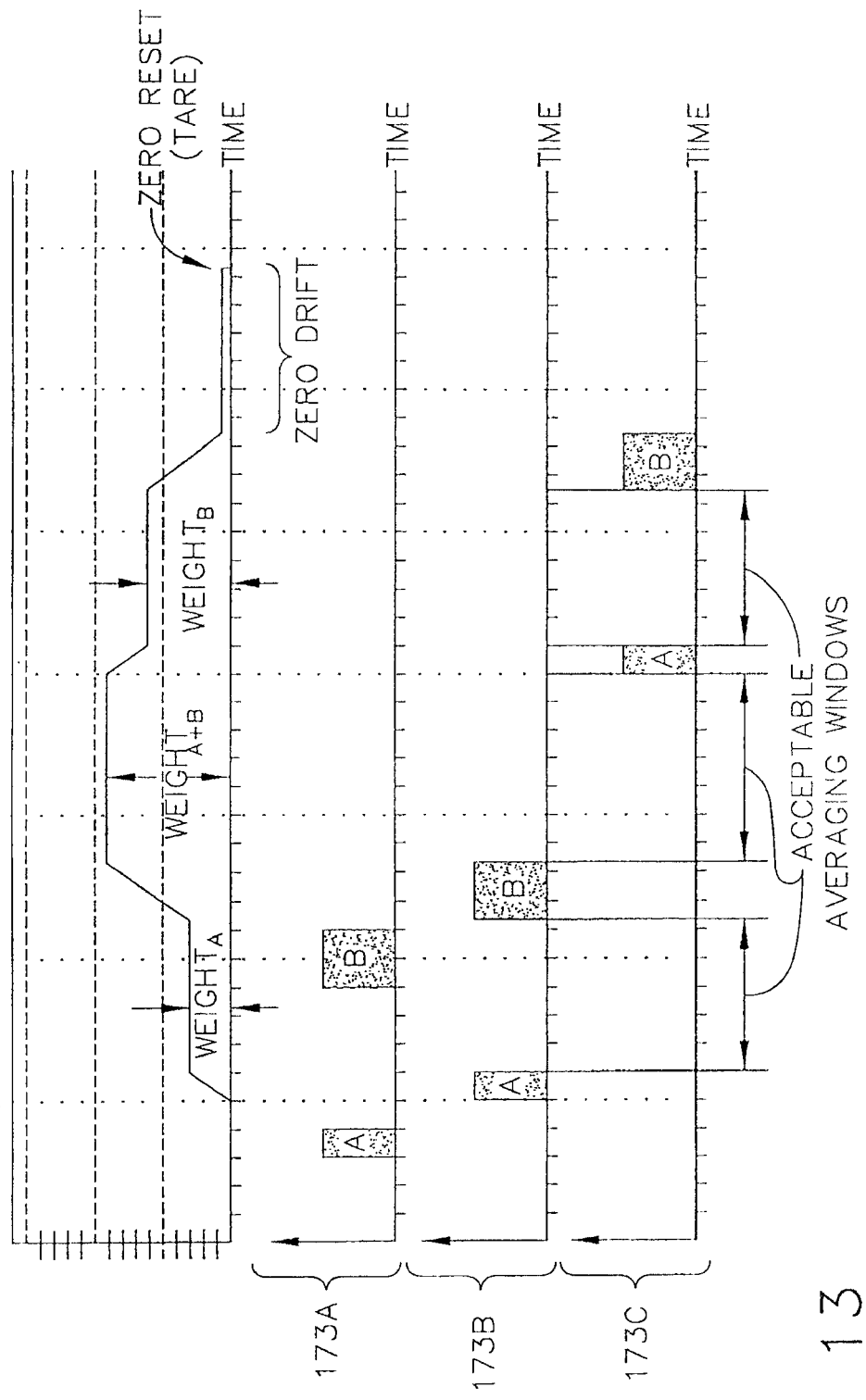
FIG. 13 is a timing diagram illustrating output of certain sensors in an embodiment of a system for item identification.

As mentioned above, various approaches are available to calculate the weight of individual items on scale 172. FIG. 13 provides timing diagrams depicting schematically each output from an element of an embodiment of the weight sensor 170 that is schematically illustrated in FIG. 12. The first data line at the top of FIG. 13 provides an example of an output of summation process 177. The second data line of FIG. 13 provides an example of an output of the in-feed conveyor belt object sensor 173A. The third data line of FIG. 13 provides an example of an output of the sensing volume entrance object sensor 173B. The fourth data line of FIG. 13 provides an example of an output of the sensing volume exit object sensor 173C. The first data line of FIG. 13 illustrates the changing, summed, digitized load cell signals as a function of time, where constant transport system speed is assumed. The second, third and fourth data lines of FIG. 13 show the (binary) output of the three object sensors.

In the second data line of FIG. 13, item A is shown detected first by the in-feed conveyor belt object sensor 173A, at the third to fourth time interval. While item A remains on the in-feed conveyor belt (as shown detected by in-feed conveyor belt object sensor 173A), the first data line shows that the weight sensor 170 does not detect a weight value as shown by the constant (0,0) from the start of the clock at zero to the fifth time interval. As item A enters the sensing volume conveyor belt shown in the third data line from the fifth second to the sixth time interval, the sensing volume entrance object sensor 173B detects the presence of item A. Item A's weight is recorded by the weight generator, as shown from about point (5,0) to about point (6,3) on the first data line in FIG. 13. After item A has completely crossed the belt gap and is entirely located on the sensing volume conveyor belt, the weight sensor 170 shows the weight of item A as static, from about point (6,3) to about point (11.5, 3). Cued by item position logic 176, the average-and-differencing process 178 averages load cell signals during the first indicated acceptable averaging window and takes the difference between the weight value 3, obtained at the end of said first acceptable averaging window, and the weight value 0, obtained just prior to item A loading onto the scale (as indicated by object sensors 173A and 173B).

As shown in the second data line, from the nine and half time interval after the start of the system to nearly the eleventh time interval, the in-feed conveyor belt object sensor 173A detects the presence of another item, B, on the in-feed conveyor belt. As item B enters the sensing volume on sensing volume conveyor belt, sensing volume entrance object sensor 173B detects item B's presence from about the 11.5 to about the 13.5 on the x axis time interval. The total weight of item A and item B is recorded by the weight sensor 170, as shown from about point (11.5,3) to point about (13.5, 9) on the first data line. After item B has completely crossed the belt gap and is entirely located on the sensing volume conveyor belt, the total weight of item A and item B is static, from about point (13.5, 9) to about point (20, 9). Cued by object position logic 176, the average-and-differencing process 178 averages load cell signals during the second indicated acceptable averaging window and takes the difference between the weight value 9, obtained at the end of said second acceptable averaging window, and the weight value 3, obtained previously for item A. That is, since the weight sensor 170 knows that item A weighs about three units, and the aggregate weight of item A and item B is nine units, then the system calculates that item B weighs about six units.

As shown in the fourth data line of FIG. 13, from the twentieth time interval to the twenty-first time interval after the start of the system, the sensing volume exit object sensor 173C detects the presence of item A exiting the sensing volume on the sensing volume conveyor belt. As item A leaves the sensing volume on the out-feed conveyor belt, the weight sensor 170 detects a diminishing weight value from about point (20, 9) to about point (21, 6). The weight sensor 170 can thus verify the weight of item A. Since the weight value dropped from about nine units to about six units when item A left the sensing volume, item A weighs about 3 units.

After item A has completely traveled out of the sensing volume and is entirely located on the out-feed conveyor belt, the weight sensor 170 shows the weight of item B as static, from about point (21, 6) to about point (27, 6). Again the weight sensor 170 can verify its first calculation of the weight value for item B by detecting a static weight value of about six units during the period of time that only item B is detected on the sensing volume conveyor belt. As shown in the fourth linear graph, from the twenty-seventh time interval to the twenty-ninth time interval after the start of the system, the sensing volume exit object sensor 173C detects the presence of item B exiting the sensing volume on the sensing volume conveyor belt. As item B leaves the sensing volume on the out-feed conveyor belt, the weight sensor 170 detects a diminishing weight value from about point (27, 6) to about point (29, 0). Subtracting 6 from 0 verifies that the item that just left the sensing volume (item B) weighs 6 units.

Load cell weight sensors often exhibit zero offset drifts over time and temperature variations. This potential drift is shown schematically in the first data line of FIG. 13 for time intervals beyond 29. In one embodiment of the system, this drift is reset automatically during periods in which no items are on the scale, as cued by object position logic 176.

The calculation approach described above may fail to operate properly when one item is loaded onto the scale at the same time that a second item is unloaded. To avoid this condition, in one embodiment object position logic 176, an AND condition for in-feed conveyor belt object sensor 173A and sensing volume exit object sensor 173C generates a command to stop the in-feed conveyor belt until the exiting item has cleared the sensing volume. This belt motor control command D50 may be transmitted to transport sensor processor 127 (FIG. 9), where the motor controllers reside for convenience.

As has been mentioned, there are multiple alternative approaches to process the total weight signals D190 to estimate the weight of individual items when they are non-singulated on the scale, generally including making weight estimates before, during, and/or after each item enters and/or leaves the scale. In addition there are alternative approaches that, under certain operating conditions, can estimate the weight of individual items even if they are partially overlapped. For example, consider the total weight values illustrated in the first data line of FIG. 13. The slopes of the transition lines between the acceptable averaging windows are proportional to the weights of the items loading onto or unloading from the scale. When there are two partially overlapping items loading onto the scale, the slope of the transition line changes as the number of items being loaded changes. Thus, in a noise free environment it is a trivial exercise to apportion the total weight measured during the stable period to the two overlapping items that loaded onto the scale.

The Geometric Merging Process Occurring within Item Description Compiler 200

Figure 14:
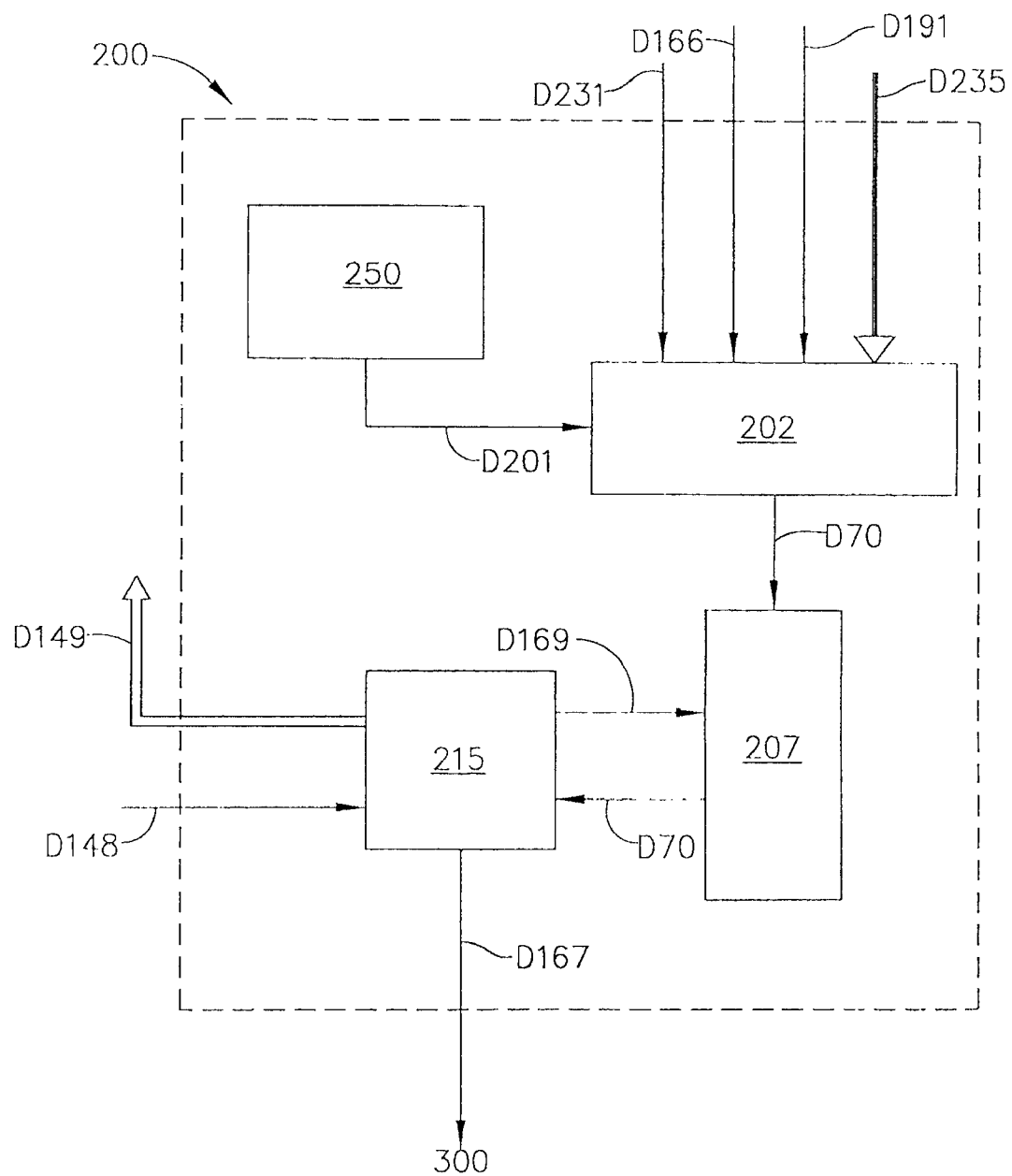
FIG. 14 is a data flow diagram illustrating data flow through an embodiment of a subsystem of a system for item identification.

FIG. 14 is a data flow diagram for an item description compiler 200 conducting the geometric merging process. The item description compiler 200 aggregates the parameter values corresponding to an individual item into an item description, wherein the parameter values are received from the various parameter processors. In the embodiment depicted in FIG. 14, the parameter values are shown as the UII value D231, dimensioning data D166, weight data D191, and digital indicia data D235, but other parameter values are contemplated herein. Each parameter value, as presented to the description compiler includes its corresponding transport system location values D148. The item description compiler 200 uses these location values to match parameter values that apply to a single item. That set of matched parameter values is the item description. The item description, when judged to be complete by the item description compiler 200, is then provided to the product identification processor.

The item description compiler 200 uses a geometric-based data association technique, using the object association library described above to aggregate the asynchronously produced item parameter values. Time can be used to correlate the various parameter values with a unique item but, because the various parameter values may have been produced at different times as the item moved through the scan tunnel, and because belt velocity may not be constant, this approach can be difficult to implement. However, the transport system location at which each item is disposed is a fixed parameter associated with that one item (once it enters the scan tunnel), as is the transport system location value, relative to a known reference location at which each sensor makes its measurement. Therefore, each measured parameter value can be matched to the item that was at the sensor's location at the moment of measurement.

During system operation, the transport location sensor 120 (shown in FIG. 9) is continually supplying a transport system location value to each parameter processor. Each parameter processor tags the parameter values it produces with the transport system location value corresponding to the instant its initial sensing data was collected. Additionally, item isolator 140 and dimension sensor 150 (both shown in FIGS. 9 & 11) provide a full three-dimensional location for each isolated item, meaning that they provide the item description compiler 200 with the mathematical description of where the surfaces of each item are in camera space. The library of calibration data 250 is a record of where in physical space each sensing element in each parameter sensor is aimed. The transformation process 202 converts the mathematical description of the surfaces of each item from camera space to physical space with accurate spatial (x,y,z) positioning information.

The transformation process 202 uses detailed knowledge of each parameter sensor's three-dimensional field of view (e.g., the vector describing where each pixel on each line-scan camera is pointed in three-dimensional space). With that information, the item description compiler 200 can associate data from the multiple parameter sensors with the item that was at a particular transport system location, as long as the spatial uncertainty of each measurement coordinate can be kept sufficiently small. In an embodiment, all spatial measurements are known to accuracies generally less than about two-tenths of an inch. The smallest features requiring spatial association are the indicia, which in practice measure at least about six tenths of an inch in their smallest dimension even with minimum line widths smaller than the about ten mils specified by the GS 1 standard. Consequently, even the smallest indicia can be uniquely associated with the spatial accuracies of the embodiment described.

The first step in being able to spatially associate parameter values with a particular item is to calibrate the absolute spatial positions of each parameter sensor's measurements. For example, the left-front line-scan camera's indicia reader transmits each digital indicia value, along with the line scan camera's pixel number of the center of the indicia and the transport system location value D148 at which the camera was triggered when reading the first corner of the indicia. The item description compiler receives that information and transforms the pixel number and transport system location into absolute spatial co-ordinates.

For the indicia reader, pixels corresponding to the four extreme points defining the edges of the visible plane inside the sensing volume are identified by accurately positioning two image targets, one at each end of a given camera (at the extreme ends of the sensing volume), and as close to the line-scan camera as possible, within the sensing volume. The pixels imaging those targets define the two near-end points of the visible image plane. The process is repeated for the two extreme points at the far-end of each line-scan camera's field of view.

For example, for the side line-scan cameras, targets are placed just above the sensing tunnel conveyor belt and at the maximum item height, as close to the input minor as possible inside the sensing volume. The same targets are imaged at the far end of that line-scan camera's range. The (x,y,z) co-ordinates for each test image target are recorded, along with the particular camera and camera pixel number where the image of each target appears. The three co-ordinates define the imaging plane for that camera. Through interpolation or extrapolation, the imaging ray for any pixel comprising that line-scan camera can be derived from those four points, and that line-scan camera's reported three co-ordinates of where it saw an indicium with the optical ray along which it was imaged can be mapped.

Accurate spatial (x,y,z) positioning information is known for each image target during geometric calibration. In some embodiments, the coordinate system is as illustrated in FIGS. 3A and 3B. The geometric calibration is performed manually, without making use of data from the transport location sensor, although the dimension estimator uses that data for its own processing. However, automated geometric calibration is also possible, using data from the transport location sensor. In an embodiment, the geometric calibration data is stored in a library 250. However, it should be clear that geometric calibration data D201 is not a required element in all embodiments. In those embodiments where it is present, the geometric calibration data D201 is transferred from the library 250 to the transformation process 202 within the item description compiler 200.

Although the line-scan camera ray alone does not uniquely define the exact point in space where the indicium was located, the line-scan camera ray intersects the three-dimensional representation of the item itself, as provided by the item isolator 140 and dimension estimator 150. Together, the line-scan camera rays and the three-dimensional item representations create a one-to-one correspondence between indicia and items.

Another parameter sensor using a level of geometric calibration is the weight estimator. In the described embodiment, the weight estimator obtains item X-axis position information from its object sensors. That is, in terms of FIG. 14, the weight estimator assigns a weight value to item A or B based on the output of at least the sensing volume entrance object sensor, which indicated where along the virtual belt the items were first loaded onto the scale. The object sensor positions can be manually calibrated by simply measuring their distances relative to the dimension estimator co-ordinates, or automatically calibrated using moving calibration items and instantaneous transport system locations reported by the transport location sensor.

It will be noted that in the illustrated embodiment items are loaded onto the in-motion scale 172 before they are observed by area camera 152. Similarly, the upward looking line-scan camera 88 (shown at least on FIG. 4A) might read an item's indicium before it is observed by area camera 152. Thus, weight measurements and indicia readings may be made before the dimension sensor 150 and item isolator 140 (schematically shown in FIG. 11) have determined what items are in the scan tunnel. Indeed, the system's product identification function would perform as well with dimension sensor 150 and upward-looking line scan camera 132A located at the end of the scan tunnel as it does with those sensors located at the front of the scan tunnel. The frontward location of these two sensors is preferred only to minimize the processing lag required to produce an identification. That is, the product identification can be produced sooner after the item leaves then tunnel when the data is collected at the front of the tunnel than at the end of the tunnel.

The weight estimator only knows the X-axis location of the items it weighs. Two items that overlap side-by-side (i.e., have common X locations but different Y locations) on the in-motion scale may be difficult to weigh individually. Thus, the reported weight in this instance is an aggregate weight of all the side-by-side items at that transport system location (x value). When a weight value arrives at the item description compiler 200 (shown schematically in FIG. 14) with a transport system location that matches more than one item, the item description compiler 200, in some embodiments, adds that weight value to each item's item description D167, along with an indication that it is an aggregate weight. In other embodiments, the unique item identifier(s) for the other side-by-side items are also added to the item description D167, for reasons described below.

The various parameter values that are transformed through the transformation process 202 become spatially-transformed parameter values D70, which are then delivered to an information queue 207. The information queue 207 is a random access buffer, that is, it does not operate in a first in first out system. Because there are generally multiple items on the sensing volume conveyor belt, and because each parameter sensor sends its sensed parameters as soon as it recognizes them, the information queue 207 at any point in time contains spatially-transformed parameter values D70 from multiple items arranged in their order of arrival. Because, for example, the latency between the time an item's indicium physically passes through a line-scan camera's field-of-view and the time the indicia reader produces the corresponding indicia value is highly variable, it is even possible that some spatially-transformed parameter values D70 may not be recognized or interpreted until long after the item has exited the system 25.

The item description compiler 200 seeks to determine which of the reported spatially-transformed parameter values D70 in the information queue 207 was measured on the surface or at the location of the item through the process of geometric merging or geo-parameter matching.

The data merging process of the item identification processor 300 depends on the dimension sensor 150 and the item isolator 140. The item isolator 140 determines what items are in the sensing volume (and gives them a unique tracking number, the UII) and the dimension sensor 150 creates dimensioning data, including but not limited to the closed height profiles with the corresponding bottom outlines. Together, the data from the item isolator 140 and the dimension sensor 150 form the baseline entry in the item description D167 being created in the item description compiler 200. Other parameter values are identified as belonging to the item and are added to the item description D167. In some embodiments, the data merging process 215 receives transport system locations D148 and delivers image retrieval requests D149 to the region extract process 138 of the indicia reader 130 shown in FIG. 10.

As mentioned above, parameter values are received by the item description compiler 200 from the various parameter sensors, undergo transformations 202 and are temporarily placed in an information queue 207. As the item description compiler 200 builds an item description D167 through having the data merging process 215 match spatially-transformed parameter values D70 with the same transport system locations D148, it sends a data request D169 to the information queue 207 to remove the spatially-transformed parameter value D70 from the information queue 207 to place it in the appropriate item description D167. Thus, spatially-transformed parameter values D70 are continuously added to and deleted from the information queue 207.

Finally, the item description D167 is sent out to the item identification processor 300. The item description compiler 200 sends the item description D167 file to item identification processor 300 at a point in the processing based on one or more selected criteria. The criteria may include, for example, sending the item description D167 when the current transport system location exceeds the item location by more than about 25% of the length of the sensing volume. In an embodiment, the send criterion may correspond to a belt position less than or equal to a particular distance from the end of the output belt.

Some parameter values are never associated with any item and may be referred to as orphan values. Orphan values are created if, for example, a parameter value is delayed by a processor reboot or if the transport system location D148 value has a defect. Likewise, where an item moves relative to the conveyor, for example a rolling bottle or can, certain values may be orphaned. An accumulation of unmatched parameter values in the information queue 207 has the tendency to impair system performance. In some embodiments, the item description compiler 200 can include functionality for deleting parameter values from the information queue 207 over a certain selected time period. The determination to delete parameter values depends on whether the virtual location of new spatially-transformed parameter value D70 arriving in the information queue 207 is significantly beyond the length of the out-feed conveyor belt, for example. This condition would indicate that the orphan value is associated with an item long gone from the sensing volume.

Item Identification Processor 300

Figure 15:
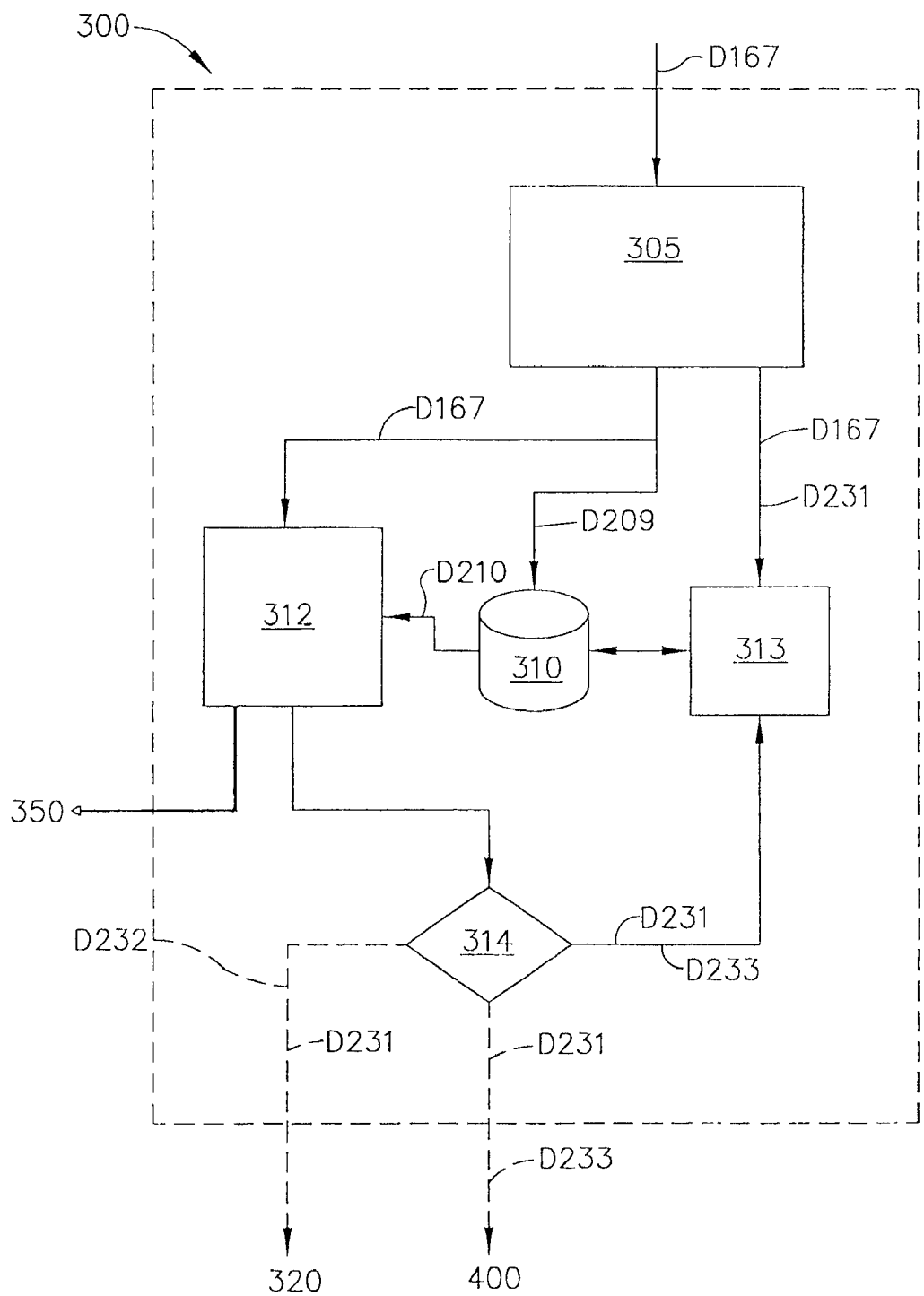
FIG. 15 is a data flow diagram illustrating data flow through an embodiment of a subsystem of a system for item identification.

FIG. 15 is a data flow diagram for the item identification processor 300. The item description compiler 200 creates an item description D167 for each item isolated by the item isolator. The item identification processor 300 opens a file for each item description D167 provided to it by the item description compiler 200. The item description D167 includes a list of all the available measured parameter values collected by the system. The basic function performed by item identification processor 300 is to compare item description D167 to a set of product descriptions, stored in the product description database 310, and to decide according to pre-determined logic rules if the item is one of those products. In some embodiments, the product descriptions in product description database 310 contain the same sort of information about the products as have been collected about the items. Typically, product descriptions include digital indicia values, weight data, and dimensioning data about the products. In some embodiments, the product description may comprise other parameter values of the products, statistical information about the various parameters (for example, the standard deviation of the weight), digital photographs of each product, etc.

In an embodiment, a polygonal representation of an item can be generated for the focal plane space of each camera. Thus, for each object, there are multiple polygons generated corresponding to each of the camera views of that object. By way of example, for a system having seven perspectives, seven polygons would be generated and stored for use in the merging process as described below.

The item identification processor 300 attempts to determine a best match between the unknown item's parameter values and the database of (known) product parameters. In some embodiments, the indicia value (typically the UPC), is used as the primary database query. Assuming an exact indicia match is found in the product description database, the item identification processor 300 examines the remaining parameter values to decide if the item is the product represented by the indicia. This is a validation that the UPC has not been misread or destroyed. As described above, partial UPCs (or other codes) may be further evaluated to narrow a number of choices of possible items, and in an embodiment, a small number of choices can be passed to an operator for resolution.

The item description D167 is provided to a formulate-database-query process 305, which compares available item parameters to determine based on, for example, a given indicium, weight and height, what the item is. When a query D209 has been formulated, the formulate-database-query process 305 delivers it to the product description database 310, which in turn provides a query result D210 to a product identification logic process 312. Product identification logic 312 compares query result D210, which is a product description, with the original item description D167 to decide if the two descriptions are similar enough to declare an identification.

The item identification processor 300 is preprogrammed with a set of logic rules by which this validation is performed. In some embodiments, the rules are deterministic (for example, the weight must be within x % of the nominal weight for the product). In other embodiments, the rules can be determined using, for example, fuzzy logic.

Fuzzy or adaptive logic may find particular use in product identification logic 312 to address unusual situations. For example, some items will have multiple digital indicia values and certain products will be known to have multiple visible indicia, since multiple line-scan cameras produce images of each item and since some items have two or more distinct indicia (e.g., a multi-pack of water, where each bottle may have one bar code, and the multi-pack case may have a different bar code). In this example, fuzzy logic may perform better than a strict rule that governs how conflicting information is handled.

Although in some embodiments the digital indicia value may be a preferred parameter value for the database lookup, there are instances in which the formulate-database-query process 305 uses one or more of the other parameter values in a first attempt to try to identify an item. For example, where indicia are misread or have been partially or fully obscured from the line-scan camera, the formulate-database-query process 305 is programmable to use the other parameter values previously described to accurately identify the item as a product. For example, if the weight, shape, and size of the item have been measured with a high degree of certainty and a few of the digits of the bar code were read, these data may provide a sufficiently unique product identification.

The output of product identification logic 312 is either a product description with a probability of identification or an exception flag which indicates that no matching product description was found. A lack of match may occur, for example, where an item is scanned that had never been entered into the database. This output is transferred to a product/exception decision process 314 in which a programmable tolerance level is applied. If the probability of identification is above this tolerance, the product identification data D233 and the UII value D231 are output. In typical embodiments, the identification output is delivered to a POS system 400. On the other hand, if the probability of identification is below the tolerance level, then product/exception decision process 314 associates an exception flag D232 with the UII D231. Optionally, in some embodiments, when an item is flagged as an exception the UII D231 is delivered to an exception handler 320. The optional exception handler 320 can include doing nothing (e.g., letting the customer have this item for free), providing an indicator to a system operator to take action, or it could involve performing an automatic rescan.

Another optional function that is part of the item identification processor is the ability to update the product description database based on the new item's parameter values. For example, the mean and standard deviation of the weight of the product, which are typical parameters stored in product description database 310, can be refined with the new weight data collected each time that particular product is identified. In some embodiments, the item identification processor 300 updates its product description database 310 with every parameter value it receives regarding items passing through the sensing volume. The database update process 313 receives UII D231 and item description D167 from the formulate database query 305 process and performs the database update when it receives the product description D233 and UII D231 from product/exception decision process 314. Database update process 313 also receives notice when UII D231 is an exception (flag D232) so that it can purge inaccurate product descriptions D167 associated with the exception UII D231.

Prior to multi-read disambiguation, the Merger employs a single-pass "best match" algorithm for assigning barcodes to an item at its scheduled output position (i.e., the Y belt position at which the Merger sends information for an item to the output subsystem for subsequent transmission to the POS). The best match algorithm for barcodes takes as input 1) a single item for which output is to be generated, 2) an item domain consisting of all items to be considered when identifying the best barcode-to-item match—the output item is also part of this domain, and 3) a barcode domain consisting of all barcodes available to be assigned to the output item.

The algorithm works by visiting each barcode in the barcode domain, in turn, and computing a matching metric (Figure Of Merit—FOM) between the barcode and all items in the supplied item domain. Once all barcode-to-item associations have been computed, the algorithm discards all associations with FOM values that are below a specific threshold (this threshold may be arrived at heuristically, and may be updated in accordance with real-world performance, either as a user setting or automatically). All remaining barcode-to-item associations are then sorted according to distance along the camera ray and the association with the shortest distance is considered to be the best match (the logic being that it is not likely to read a barcode on an item that is behind another item—thus, the barcode closest to the camera lens is more likely to be properly associated with the front item). If the item identified as the best match is the same as the output item, the barcode is assigned to the output item. Otherwise, the barcode is not assigned.

While in the foregoing specification this invention has been described in relation to certain particular embodiments thereof, and many details have been set forth for purpose of illustration, it will be apparent to those skilled in the art that the invention is susceptible to alteration and that certain other details described herein can vary considerably without departing from the basic principles of the invention. In addition, it should be appreciated that structural features or method steps shown or described in any one embodiment herein can be used in other embodiments as well.

We claim:

1. A system for asynchronously identifying an item within a sensing volume comprises:
   a plurality of object sensors, each object sensor configured and arranged to determine at least one parameter describing objects as they are relatively moved with respect to the sensing volume, and having a known position and attitude with respect to the sensing volume;
   a position sensor, configured and arranged to produce position information relating to the relative movement, wherein the position information does not comprise system clock information;
   a pair of area dimensioning sensors, each area dimensioning sensor configured and arranged to determine an instantaneous width of the object as the object relatively moves past a substantially planar field of view of each respective area dimensioning sensor, wherein one of the area dimensioning sensors comprises a bright field imaging sensor and the other of the area dimensioning sensors comprises a dark field imaging sensor and the processor determines the instantaneous width based on an output of one or both of the area imaging sensors; and
   a processor, configured and arranged to receive the parameters from the object sensors and to associate the parameters with respective ones of the objects on the basis of the position information and on the basis of the known position and attitude of the object sensor that determined each respective parameter, without taking into account system clock information, and to, for each object having at least one associated parameter, compare the at least one associated parameter to known item parameters to assign an item identification to the object.

2. A system as in claim 1, wherein the object sensors further comprise:
a height dimensioning sensor comprising a substantially planar light source, configured and arranged to project planar illumination at an angle to a path of the objects during their relative movement in the sensing volume;
an associated height dimensioning detector, constructed and arranged to detect a reflection of the planar illumination; and
wherein the processor is configured and arranged to determine, based on the detected reflection and the angle, a height profile of each object.

3. A system as in claim 1, further comprising an object discriminator that is configured and arranged to singulate objects based on object outlines created from a plurality of instantaneous widths measured by the dimensioning sensors.

4. A system as in claim 1 wherein a plurality of the object sensors comprise line scan cameras and the processor is further configured and arranged to process images captured by the line scan cameras to identify an indicium for each object.

5. A system as in claim 4, wherein the indicium comprises a bar code, and the processor is configured and arranged to identify the bar code.

6. A system as in claim 5, wherein the bar code further comprises characters, and the processor is further configured and arranged to identify the characters of the bar code.

7. A system as in claim 6, wherein the characters of the bar code are identified using an algorithm selected from the group consisting of an optical character recognition algorithm and a matching algorithm that is based on a comparison between character shape and a library comprising selected possible character shapes.

8. A method of asynchronously identifying an item within a sensing volume comprises:
determining at least one parameter describing objects as they are relatively moved with respect to the sensing volume, using a plurality of object sensors, each having a known position and attitude with respect to the sensing volume;
determining an instantaneous width of the object as the object relatively moves past a substantially planar field of view of each of a pair of area dimensioning sensors, wherein one of the area dimensioning sensors comprises a bright field imaging sensor and the other of the area dimensioning sensors comprises a dark field imaging sensor, based on an output of one or both of the area imaging sensors;
producing position information relating to the relative movement, wherein the position information does not comprise system clock information; and
associating the parameters with respective ones of the objects on the basis of the position information and on the basis of the known position and attitude of the object sensor that determined each respective parameter, without taking into account system clock information, and to, for each object having at least one associated parameter, compare the at least one associated parameter to known item parameters to assign an item identification to the object.

9. A method as in claim 8, further comprising:
projecting planar illumination at an angle to a path of the objects during their relative movement in the sensing volume;
detecting a reflection of the planar illumination; and
determining, based on the detected reflection and the angle, a height profile of each object.

10. A method as in claim 8, further comprising:
singulating objects based on object outlines created from a plurality of instantaneous widths measured by the dimensioning sensors.

11. A method as in claim 8, further comprising:
processing images captured by the object sensors to identify an indicium for each object.

12. A method as in claim 11, wherein the indicium comprises a bar code and further comprises characters, and the processing images further comprises identifying the characters of the bar code using an algorithm selected from the group consisting of an optical character recognition algorithm and a matching algorithm that is based on a comparison between character shape and a library comprising selected possible character shapes.

\* \* \* \* \*